United States Patent
Maeda et al.

(10) Patent No.: US 9,483,049 B2
(45) Date of Patent: Nov. 1, 2016

(54) ANOMALY DETECTION AND DIAGNOSIS/PROGNOSIS METHOD, ANOMALY DETECTION AND DIAGNOSIS/PROGNOSIS SYSTEM, AND ANOMALY DETECTION AND DIAGNOSIS/PROGNOSIS PROGRAM

(75) Inventors: Shunji Maeda, Yokohama (JP); Hisae Shibuya, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1119 days.

(21) Appl. No.: 13/384,463

(22) PCT Filed: Jun. 16, 2010

(86) PCT No.: PCT/JP2010/060232
§ 371 (c)(1),
(2), (4) Date: Jan. 17, 2012

(87) PCT Pub. No.: WO2011/027607
PCT Pub. Date: Mar. 10, 2011

(65) Prior Publication Data
US 2012/0166142 A1 Jun. 28, 2012

(30) Foreign Application Priority Data

Sep. 7, 2009 (JP) ................................. 2009-206103

(51) Int. Cl.
*G05B 23/02* (2006.01)

(52) U.S. Cl.
CPC ................................ *G05B 23/0227* (2013.01)

(58) Field of Classification Search
CPC .......... G05B 23/0227; G05B 23/0224; G05B 23/0229; G05B 23/0235; G05B 23/024; G05B 23/00; G05B 23/0218; G05B 23/0221; G05B 13/028; G07C 3/00; G07C 3/005; G06N 99/00
USPC ..................................... 702/182–185; 706/45
See application file for complete search history.

(56) References Cited

U.S. PATENT DOCUMENTS 5,414,798 A * 5/1995 Nigawara et al. ............... 706/59
5,548,597 A * 8/1996 Kayama et al. ............... 714/736
(Continued)

FOREIGN PATENT DOCUMENTS

JP      5-45186 A     2/1993
JP      6-295271 A    10/1994
(Continued)

OTHER PUBLICATIONS

Japanese Office Action with English Translation dated Feb. 12, 2013 (eight (8) pages).
(Continued)

*Primary Examiner* — Manuel L Barbee
(74) *Attorney, Agent, or Firm* — Crowell & Moring LLP

(57) ABSTRACT

Provided is an anomaly detection method and system capable of constructing determination condition rules of anomaly detection from case-based anomaly detection by way of multivariate analysis of a multi-dimensional sensor signal, applying the rules to design-based anomaly detection of individual sensor signals, and also appropriately executing setting and control of threshold values for highly sensitive, early, and clearly visible detection of anomalies. Anomaly detection on the basis of a case base by way of multivariate analysis controls design-based anomaly detection. That is to say, (1) anomaly detection on the basis of a case base performs selection of sensor signals and anomaly detection according to various types of anomalies. Specifically, anomaly detection (characteristic conversion), evaluation of level of effect of each signal, construction of determination conditions (rules), and display and selection of sensor signals corresponding to the anomaly are performed. (2) Design-based anomaly detection for individual sensor signals performs anomaly detection after the above have been performed. Specifically, setting and control of thresholds, display of thresholds, and anomaly detection and display are performed.

23 Claims, 22 Drawing Sheets

Design-based Anomaly Detection targeting Individual Sensor Signals: Univariate Analysis Filter processing may adopt differential, integration of a certain range, down sampling, etc.
Threshold is set by designer or engineer having knowledge of facility.

(56) References Cited

U.S. PATENT DOCUMENTS

| | | | |
|---|---|---|---|
| 5,621,158 A | 4/1997 | Kitamura et al. | |
| 6,216,066 B1 | 4/2001 | Goebel et al. | |
| 6,952,662 B2 | 10/2005 | Wegerich et al. | |
| 6,975,962 B2 | 12/2005 | Wegerich et al. | |
| 2002/0035447 A1 | 3/2002 | Takahashi et al. | |
| 2007/0244841 A1 | 10/2007 | Vatchkov et al. | |
| 2007/0291991 A1 | 12/2007 | Otsu et al. | |
| 2008/0082475 A1* | 4/2008 | Aggarwal et al. | 706/48 |

FOREIGN PATENT DOCUMENTS

| | | | |
|---|---|---|---|
| JP | 7-110708 A | 4/1995 | |
| JP | 7-160327 A | 6/1995 | |
| JP | 10-283024 A | 10/1998 | |
| JP | 2000-259223 A | 9/2000 | |
| JP | 2002-99323 A | 4/2002 | |
| JP | 2002-139377 A | 5/2002 | |
| JP | 2006-53818 A | 2/2006 | |
| JP | 2006-106870 A | 4/2006 | |
| JP | 2006-343063 A | 12/2006 | |
| JP | 2007-334756 A | 12/2007 | |
| JP | 2008-256981 A | 10/2008 | |
| JP | 2009-70071 A | 4/2009 | |

OTHER PUBLICATIONS

Takekazu Kato et al., One Class Classifier Based on Proximity Between Pattens, IS-2-10, MIRU 2007, pp. 762-767.

Corresponding International Search Report with English Translation dated Jul. 20, 2010 (four (4) pages).

Stephan W. Wegerich et al., "Nonparametric Modeling of Vibration Signal Features for Equipment Health Monitoring", Aerospace Conference, 2003, vol. 7, pp. 3113-3121.

Yoshiteru Ishida, "Sensor Diagnosis of Process Plants by an Immune-Based Model", Systems Control and Information, vol. 38, No. 1, Jan. 15, 1994. (eleven (11) pages).

Partial Supplementary European Search Report issued in counterpart European Application No. 10813558.3 dated Dec. 18, 2015 (eight (8) pages).

C. Byington et al., "Data Fusion for Developing Predictive Diagnostics for Electromechanical Systems," Jan. 1, 2001, URL:///dsp-book.narod.ru/HMDF/2379ch23.pdf, XP055101037 (thirty-two (32) pages).

E. Oja et al., "The Subspace Learning Algorithm as a Formalism for Pattern Recognition and Neural Networks," Neural Networks, 1988, vol. 1 (Jul. 24. 1988), pp. 1-277-1-284, XP032131419.

* cited by examiner

FIG. 4

(Characteristic Conversion)

| Type | Method View | Function |
|---|---|---|
| PCA: Principal Component Analysis | | Maximum dispersion (data quantity) of data X. Only X is considered. No objective variable (unsupervised). Dimension reduced. |
| ICA: Independent Component Analysis | | X is represented via linear combination of mutually independent vectors ($X = X_1 \cdot X_2$). Nongaussian distribution appears. No objective variable (unsupervised). Dimension reduced. |
| NMF: Non-negative Matrix Factorization | | X is resolved to non-negative matrix products ($X = X_1 \cdot X_2$). Minimum square error. Targets non-negative signals. No objective variable (unsupervised). |
| PLS: Projection to Latent Structure | | After converting X to latent variable ($X' = AX$), regression analysis of Y is performed. X is used to indirectly explain Y. |
| CCA: Canonical Correlation Analysis | | A and B are computed where correlation of linear combination AX of X and linear combination BY of Y is highest (minimum angle). |

X: Explanatory variable, Y: Objective variable

FIG. 6

Case-based Anomaly Detection targeting
    Multi-dimensional Sensor Signals : Multivariate Analysis

- Anomaly detection (characteristic conversion)
- Evaluation of level of effect of each signal
- Construction of determination conditions (rules)
- Selection and display of sensor signals corresponding to anomaly Design-based Anomaly Detection targeting
    Individual Sensor Signals : Univariate Analysis

- Setting and control of threshold value
- Display of each signal and threshold value
- Display of detected anomaly

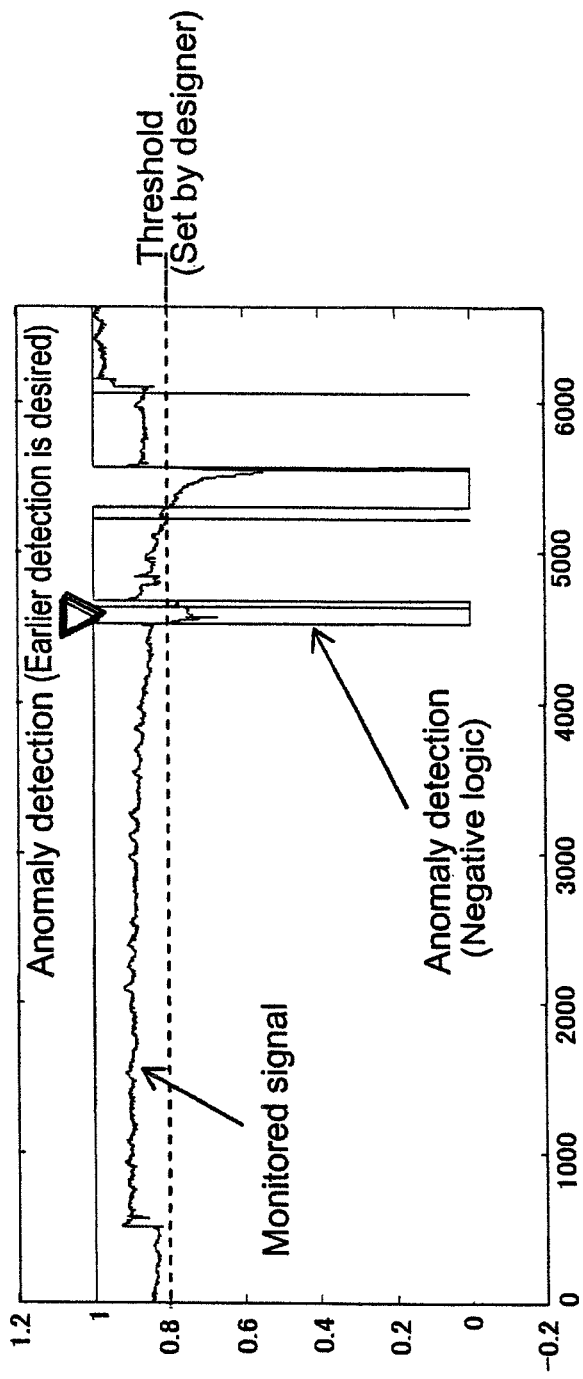

FIG. 9
(Case-based Anomaly Detection targeting Multi-dimensional Sensor Signals : Multivariate Analysis)
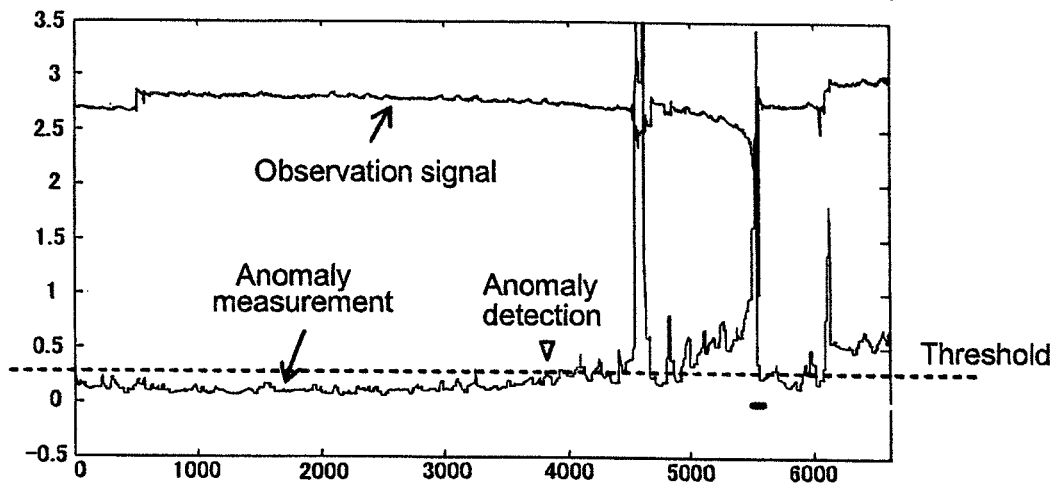
Transition of Level of effect of Sensor Signals regarding Anomaly
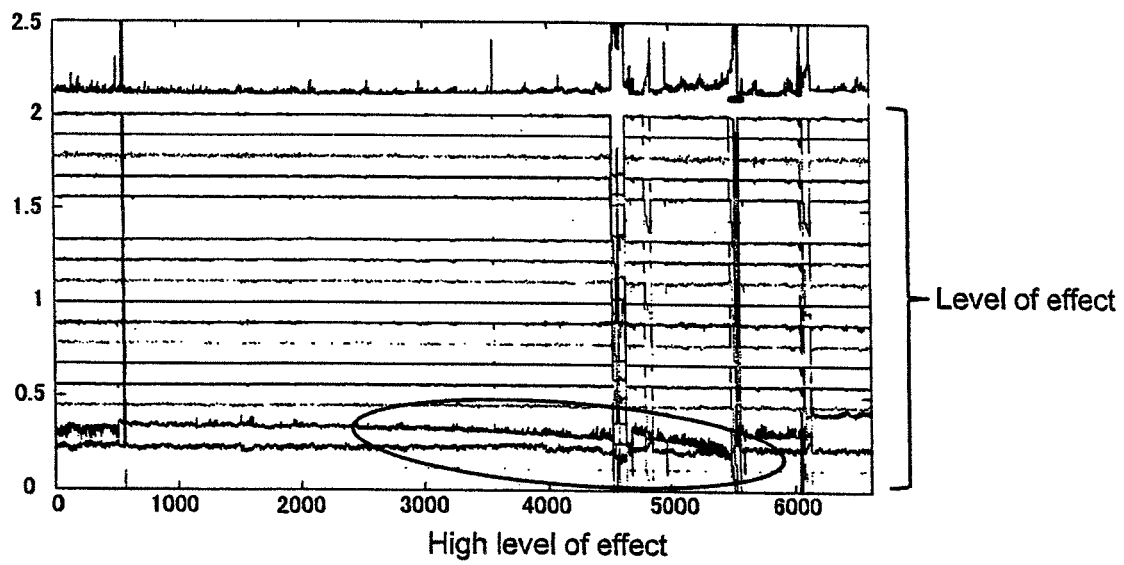
High level of effect

- The operation environment of the facility, change in status due to operation years, operation conditions, influence of component replacement etc. can be reflected.
- Detection is hastened, preventive maintenance is enabled and early replacement of component causing failure is enabled.

FIG.20

| Block name | Major component | Signal information | Link destination block | Link destination major component |
|---|---|---|---|---|
| Block A | J001 | +12V | Block B | U001 |
| Block B | K001 | Signal | Block C | U001 |
| Block C | U001 | +5V | ... | ... |
| ... | ... | ... | ... | ... |

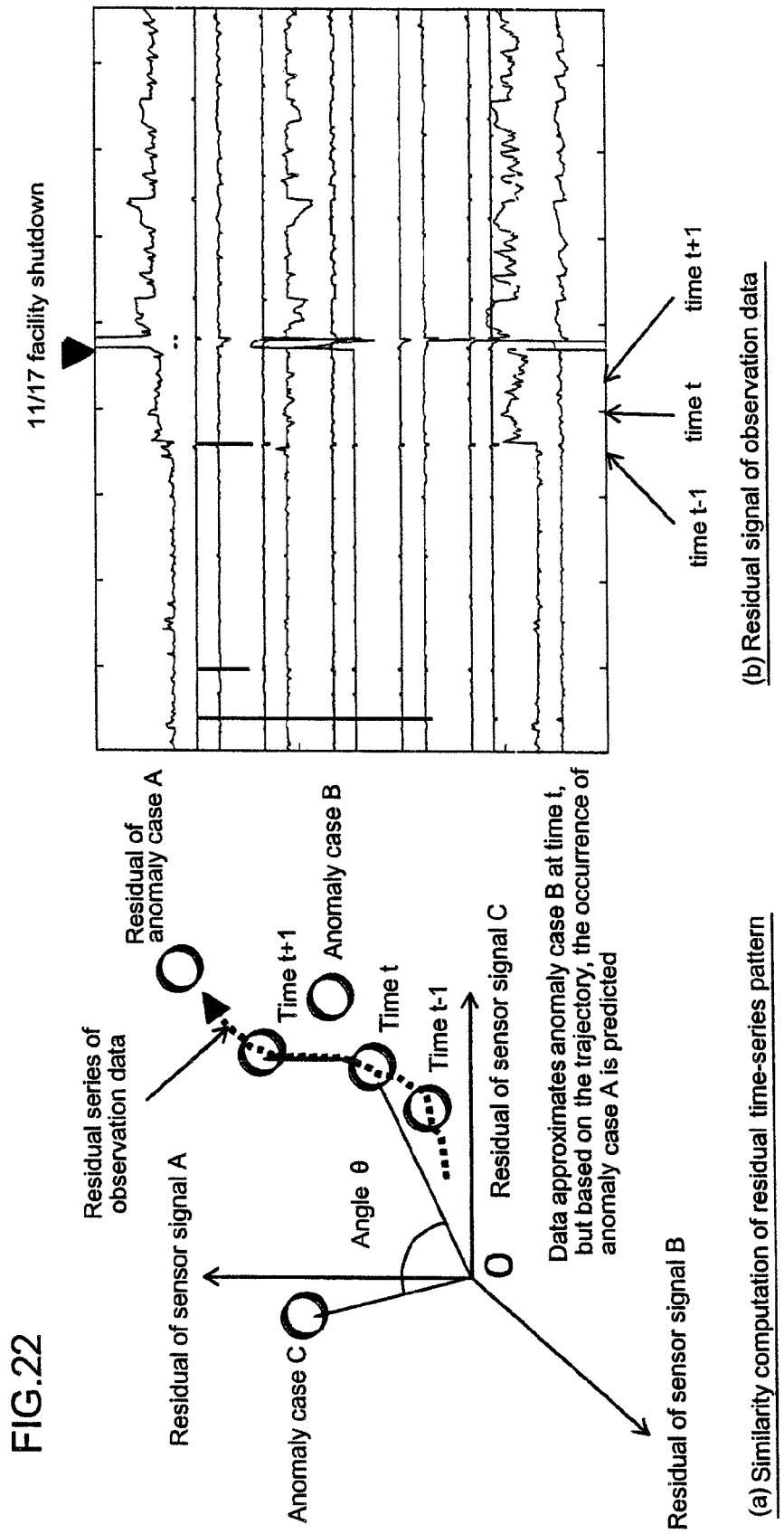

ANOMALY DETECTION AND DIAGNOSIS/PROGNOSIS METHOD, ANOMALY DETECTION AND DIAGNOSIS/PROGNOSIS SYSTEM, AND ANOMALY DETECTION AND DIAGNOSIS/PROGNOSIS PROGRAM

The present application is the U.S. National Phase of International Application No. PCT/2010/060232, filed on Jun. 16, 2010, which claims the benefit of Japanese Patent Application No. 2009-206103, filed Sep. 7, 2009, the entire contents of which are hereby incorporated by reference.

TECHNICAL FIELD

The present invention relates to an anomaly detection and diagnosis/prognosis method for detecting anomaly in plants and facilities at an early stage, and an anomaly detection and diagnosis/prognosis system thereof.

BACKGROUND ART

Power companies utilize waste heat of gas turbines or the like to provide local heating water or provide high-pressure and low-pressure steam to plants. Petrochemical companies operate gas turbines and the like as power-supply facilities. In various plants and facilities utilizing gas turbines and the like, the discovery of anomaly of such devices at an early stage is extremely important in minimizing damages to the society.

In addition to gas turbines and steam turbines, there is a numerous list of facilities that must be subjected to detection of anomaly at an early stage, including water wheels in hydroelectric power plants, atomic reactors in atomic power plants, windmills in wind power plants, engines of aircrafts and heavy equipments, railway vehicles and rails, escalators, elevators, MRI and other medical equipment, manufacturing and inspecting devices for semiconductors and flat panel displays and so on, and further, device level or component level anomalies must be detected such as the deterioration or end of life of mounted batteries and the like. Recently, the importance of detecting anomaly (various symptoms) of the human body, such as the measurement and diagnosis/prognosis of brain waves for health management, is increasing.

As disclosed in patent literature 1 and patent literature 2, SmartSignal Corporation (US) provides a service of anomaly detection mainly targeting engines. Past data are stored in a database (DB), and the similarity between the observation data and past learning data are computed via a unique method to thereby compute an estimate value via linear coupling of data having high similarity so as to output the degree of deviation of the estimate value and the observation data. General Electric Company teaches detecting anomaly via k-means clustering as taught in patent literature 3.

Citation List

Patent Literature

[PTL 1]
U.S. Pat. No. 6,952,662
[PTL 2]
U.S. Pat. No. 6,975,962
[PTL 3]
U.S. Pat. No. 6,216,066

Non Patent Literature

[NPL 1]
Stephan W. Wegerich; Nonparametric modeling of vibration signal features for equipment health monitoring, Aerospace Conference, 2003. Proceedings. 2003 IEEE, Volume 7, Issue, 2003 Page(s): 3113-3121

SUMMARY OF INVENTION

Technical Problem

Generally, a system for detecting anomaly by monitoring observation data and comparing the same with a threshold value set in advance is well known. According to such system, the threshold value is set by focusing on the physical quantity of the target of measurement which are the respective observation data, so that the system can be classified as a design-based anomaly detection. According to the method, anomaly that is not intended by design cannot be detected easily, and anomaly may be missed. For example, the threshold values set in advance may not be appropriate due to influences such as the operation environment of the facility, the change in status through years of operation, operation conditions, and influence of replacement of components.

On the other hand, according to the method based on case-based anomaly detection adopted by SmartSignal Corporation, an estimate value is computed via linear coupling of data having high similarity with observation data targeting learning data, and the degree of deviation of the estimate value and observation data is output, so that if appropriate learning data is prepared, it is possible to consider the influence of the operation environment of the facility, the change in status through years of operation, operation conditions, and influence of replacement of components. However, explanation is required regarding why anomaly is included in the observation data. It is extremely difficult to explain anomaly in anomaly detection within feature space having subtle physical significance, such as the k-means clustering performed by General Electric Corporation. Cases that are difficult to explain may be handled as erroneous detection. Conventionally, design-based anomaly detection and case-based anomaly detection are operated independently without mutual interconnection.

The object of the present invention is to solve the problems of the prior art mentioned above by providing a method for interconnecting design-based anomaly detection and case-based anomaly detection. The present invention enables to construct a rule that can be referred to as the determination conditions of anomaly detection based on case-based anomaly detection via multivariate analysis, and to apply the rule to the design-based anomaly detection. Furthermore, the invention enables appropriate execution of the setting and control of threshold values. Thereby, the present invention provides an anomaly detection method and anomaly detection system capable of performing highly sensitive, early and clearly visible anomaly detection.

Solution to Problem

In order to achieve the above objects, the present invention provides a method to control design-based anomaly detection targeting individual sensor signals by the case-based anomaly detection via multivariate analysis targeting multi-dimensional sensor signals. In other words, (1) the case-based anomaly detection performs selection of sensor signals and setting of threshold values according to various types of anomalies. Specifically, the system performs anomaly detection (characteristic conversion), evaluation of level of effect of each signal, construction of determination conditions (rules), and selection and display of sensor signals corresponding to the anomaly. (2) The design-based anomaly detection targeting individual sensor signals performs anomaly detection based on the above case-based anomaly detection. Specifically, the present system performs setting and control of thresholds, display of thresholds and anomaly detection. The case-based anomaly detection performs modeling of the learning data via a subspace classifier, and detects an anomaly candidate based on the distance relationship of observation data and subspace.

Furthermore, k-number of highest data having a high similarity with respect to the individual data included in the learning data are obtained for each observation data, and a subspace is generated based thereon. The number k is not a fixed value, and is set to an appropriate value for each observation data, by selecting a learning data in which the distance from the observation data is within a predetermined range, and gradually increasing the number of learning data from a minimum number to a selected number so as to select the data in which the projection distance is minimum. As for the form of service provided to customers, the method for performing anomaly detection is realized via a program, and the program is provided to customers through media or on-line service.

Advantageous Effects of Invention

The present invention enables to clarify the points of observation of the observation data, according to which the anomaly explaining performance is improved significantly. Specifically, the individual sensor signals are displayed and threshold values thereof are set, so that the correspondence with individual sensor signals representing physical quantities is clear, and the physical meaning thereof can be comprehended easily. A multivariate analysis method with a heavy calculation load can be implemented, and highly sensitive anomaly predictor detection is enabled. The present invention enables to detect the smallest anomalies at an early stage.

According to the present invention, anomalies can be discovered at an early stage and with high accuracy not only in facilities using gas turbines and steam turbines but also in other facilities such as water wheels in hydroelectric power plants, atomic reactors in atomic power plants, windmills in wind power plants, engines of aircrafts and heavy equipments, railway vehicles and rails, escalators, elevators, MRI and other medical equipment, manufacturing and inspecting devices for semiconductors and flat panel displays and so on, and the present invention enables to also discover device level or component level anomalies such as the deterioration or end of life of mounted batteries and the like.

BRIEF DESCRIPTION OF DRAWINGS

FIG. 4 is an explanatory view of various characteristic conversions used in case-based anomaly detection.

FIG. 6 is an explanatory diagram of role-sharing.

FIG. 7 shows an example of observation signals, and illustrates the result of anomaly detection via certain threshold values in an individual detection method.

FIG. 9 is a view showing the result of case-based anomaly detection.

FIG. 20 is a view illustrating one example of component information according to the present invention.

FIG. 22 is an explanatory view of (a) the method of similarity computation of residual time-series pattern of the art of detecting a predictor of occurrence of anomaly via a residual time-series pattern and (b) residual signals of observation data corresponding to (a).

DESCRIPTION OF EMBODIMENTS

Now, the preferred embodiments of the present invention will be described with reference to the drawings.

Figure 1:
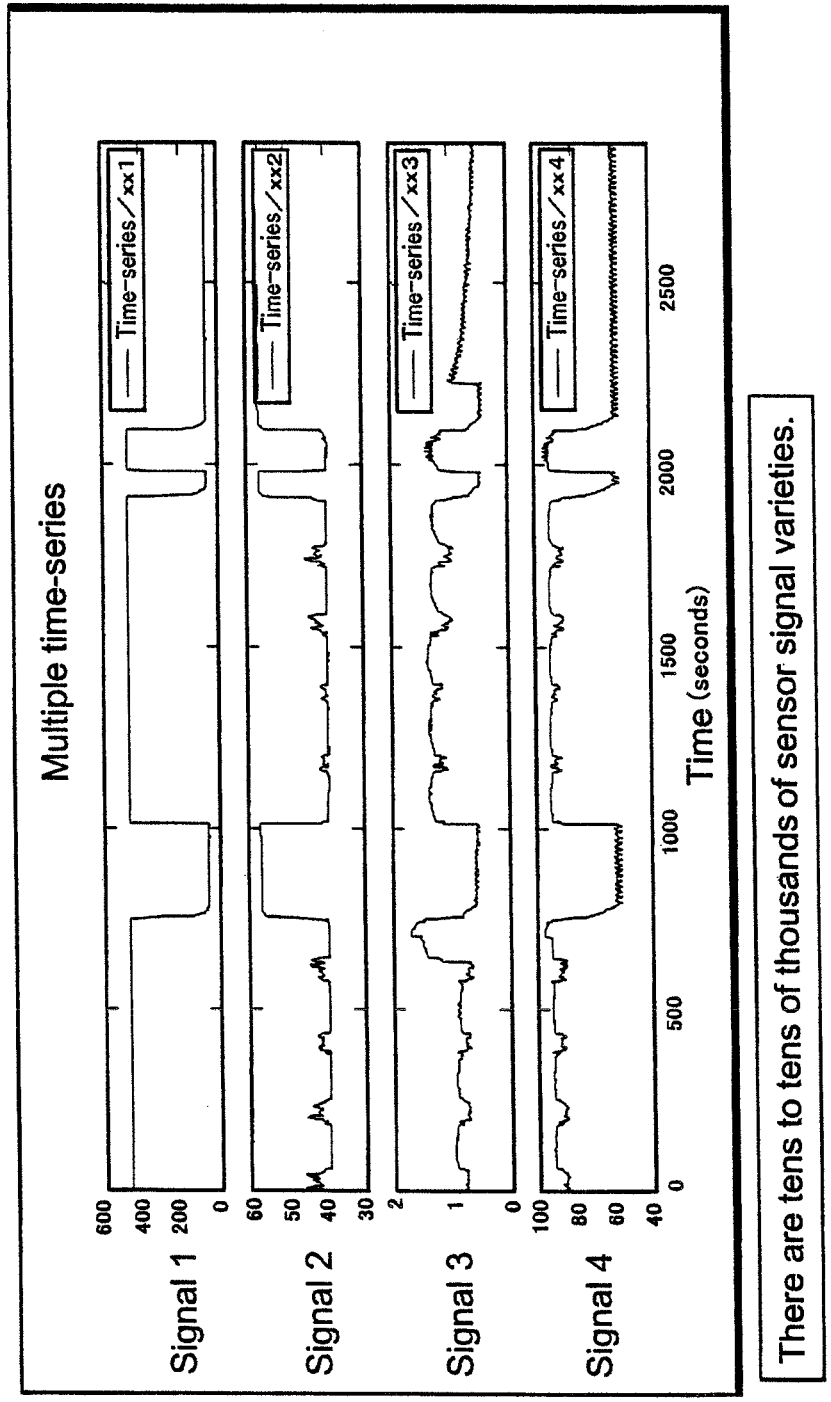
FIG. 1 shows an example of multi-dimensional time-series signals as target in an anomaly detection system according to the present invention.

FIG. 1 illustrates one example of sensor signals as the target of the anomaly detection system according to the present invention. There are tens to tens of thousands of varieties of sensor signals. The varieties of sensor signals are determined based on the scale of the facility or the social damage when the facility fails. The target signals are multi-dimensional, time-series sensor signals related for example to the power-generation voltage, the exhaust-gas temperature, the cooling water temperature, the cooling water pressure and the operation time. The installation environment and the like are also monitored. There are also a variety of sampling timings of the sensors, from tens of ms to tens of seconds.

Figure 2:
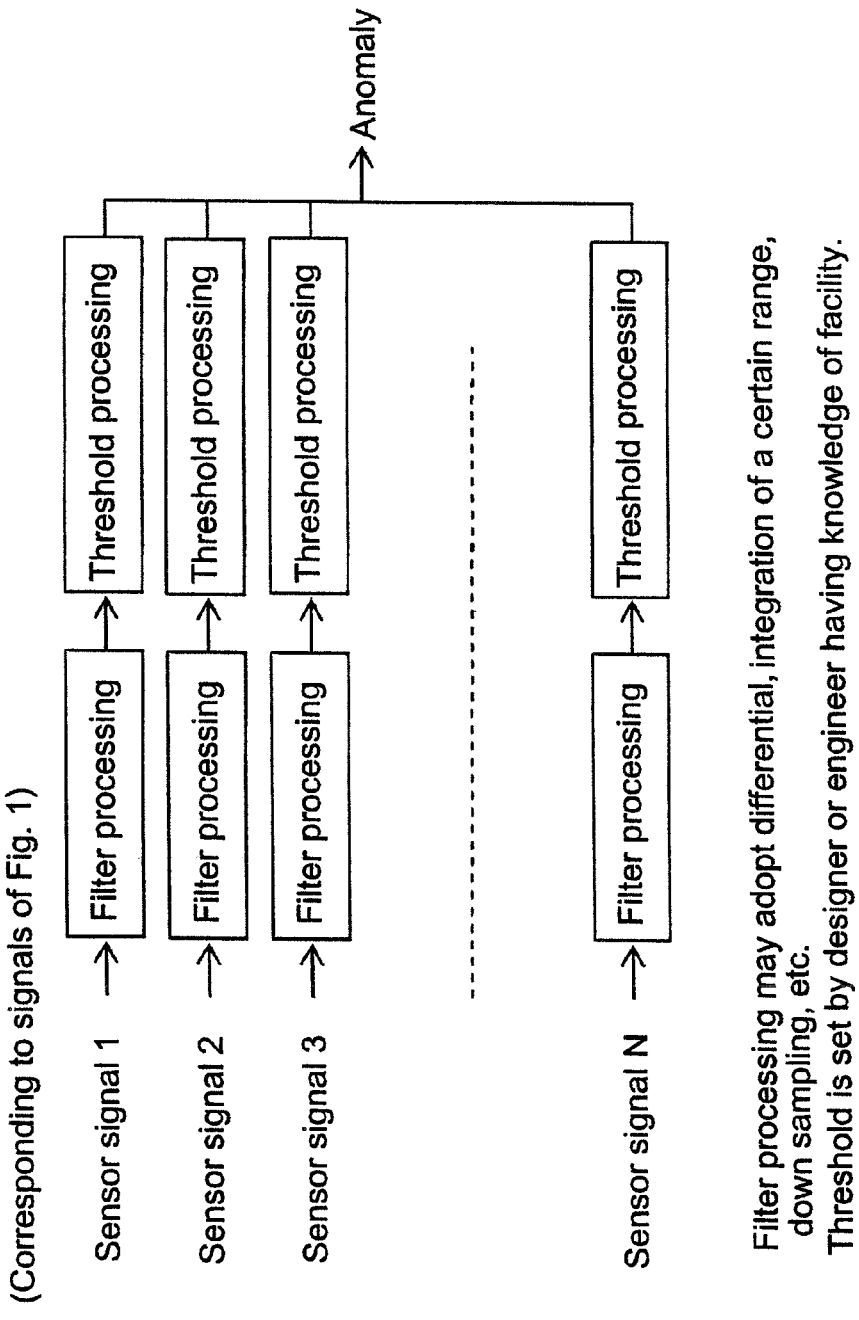
FIG. 2 shows an example of the art of individual detection for performing anomaly detection via threshold processing of multi-dimensional time-series signals.

FIG. 2 illustrates a method for detecting anomaly using multi-dimensional time-series sensor signals as input. Multi-dimensional time-series sensor signals are processed from various viewpoints based on the knowledge on what is defined as anomaly. For example, sensor signals are differentiated at the filter processing section of the drawing so as to capture the time variation of the signals. In another example, signals within a predetermined period may be added via integral processing. Furthermore, the process may focus on the frequency of the signals to perform processes such as a Fourier transform or a wavelet transform.

After performing such processing, threshold values are set according to the threshold processing shown in the same drawing (for example, a maximum threshold and a minimum threshold are set), and determination is performed on whether anomaly exists or not. Filter processing can be varied for each sensor signal or can be the same for all signals. Although not shown, it is also possible to perform normalization (canonicalization) of the sensor signals.

According to the above method, the threshold values are set based on the knowledge of design. In other words, the threshold values are set considering the desirable or ideal physical quantities that the sensor signals represent, the operation status of the facility, the environment and the history thereof. This method relates to a so-called design-based anomaly detection. Such design-based anomaly detection is easily understood by designers and service providers. Since the threshold values are based on physical phenomenon, they are visible and therefore easy to set up. In other words, since the target of threshold values is the number of rotation or the pressure to which the design criteria can be applied, and since they are not closely related to other sensor signals and can be considered independently and individually, the phenomenon is easily understood and the possible range, the maximum value and the minimum value of the signals can be set up easily based on the design criteria. On the other hand, the above method has a drawback in that the anomaly astride a plurality of sensor signals cannot be identified easily.

Another drawback is that anomaly unintended by the designer cannot be detected. Many of the actual anomalies are not intended by the designer, and in that sense, the design-based anomaly detection method has problems. Of course, it is possible to accumulate sensor signals and to handle the signals statistically. However, such method cannot consider the behavior of other signals and thus the method is considered to have a low detection limit.

Figure 3:
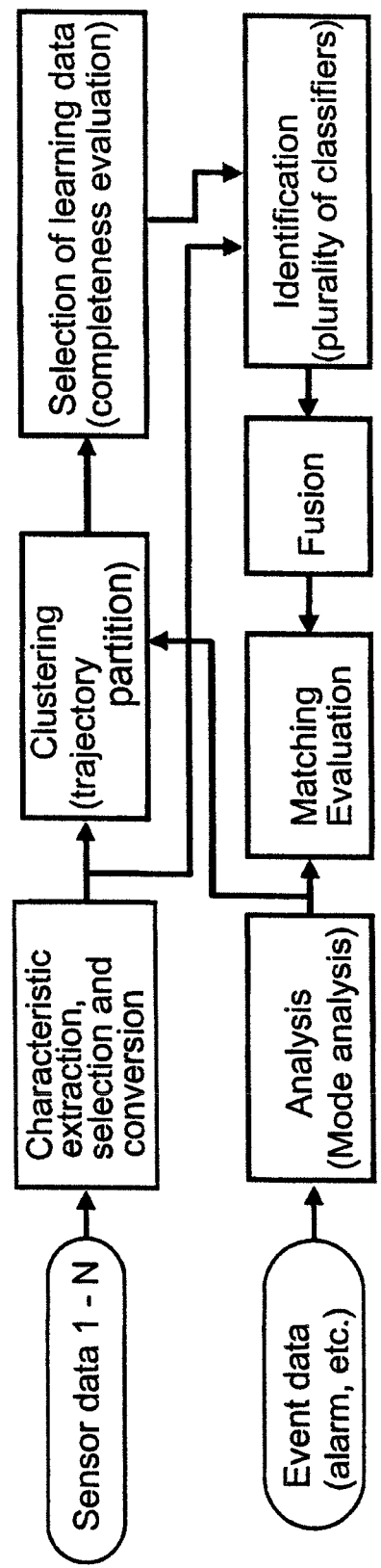
FIG. 3 is a typical example of case-based anomaly detection.

FIG. 3 illustrates a case-based method for detecting anomaly. Multivariate analysis is performed to multi-dimensional time-series sensor signals to extract outliers from normal data. Selection of learning data (completeness evaluation) and anomaly diagnosis/prognosis may be performed using event data (such as alarm information) other than sensor data. Further, a more robust anomaly detection can be realized via identification using a plurality of classifiers.

FIG. 4 illustrates an example of a characteristic conversion for deleting the dimension of multi-dimensional time-series signals used in FIG. 3. Methods other than the principal component analysis is applicable, such as an independent component analysis, a non-negative matrix factorization, a projection to latent structure algorithm, canonical correlation analysis and so on. The method view and functions of the methods are illustrated in FIG. 4. The principal component analysis is called PCA, which performs linear transformation of a multi-dimensional time-series signal of M dimensions to an r-dimensional multi-dimensional time-series signal having r-number of dimensions, and creates an axis where the variation is maximum. It can also adopt a Karhunen-Loeve transform. The number of dimensions r is determined based on a cumulative contribution ratio obtained by aligning eigenvalues calculated via principal component analysis in descending order and dividing the eigenvalues added from the largest values by the total value of all eigenvalues.

The independent component analysis is called ICA, which is an effective method for exposing nongaussian. The non-negative matrix factorization is called NMF, which resolves the sensor signals given in matrix into non-negative components. The unsupervised methods are effective transform techniques according to the present embodiment having a small number of anomaly cases and therefore cannot be utilized. An example of linear transformation is illustrated here. Nonlinear transformation is also applicable.

The above-mentioned characteristic conversion, including canonicalization in which values are normalized via reference residual, is performed by arranging learning data and monitored data and performing the conversion simultaneously. Thus, learning data and monitored data can be handled equally. Since sensor signals are converted via characteristic conversion, the case-based anomaly detection is confusing for designers and service providers. Since the data are related with other sensor signals and are not independent and individual, the phenomenon is difficult to understand. On the other hand, the present method has an advantageously high sensitivity since outliers are extracted through comparison with normal data.

Figure 5:
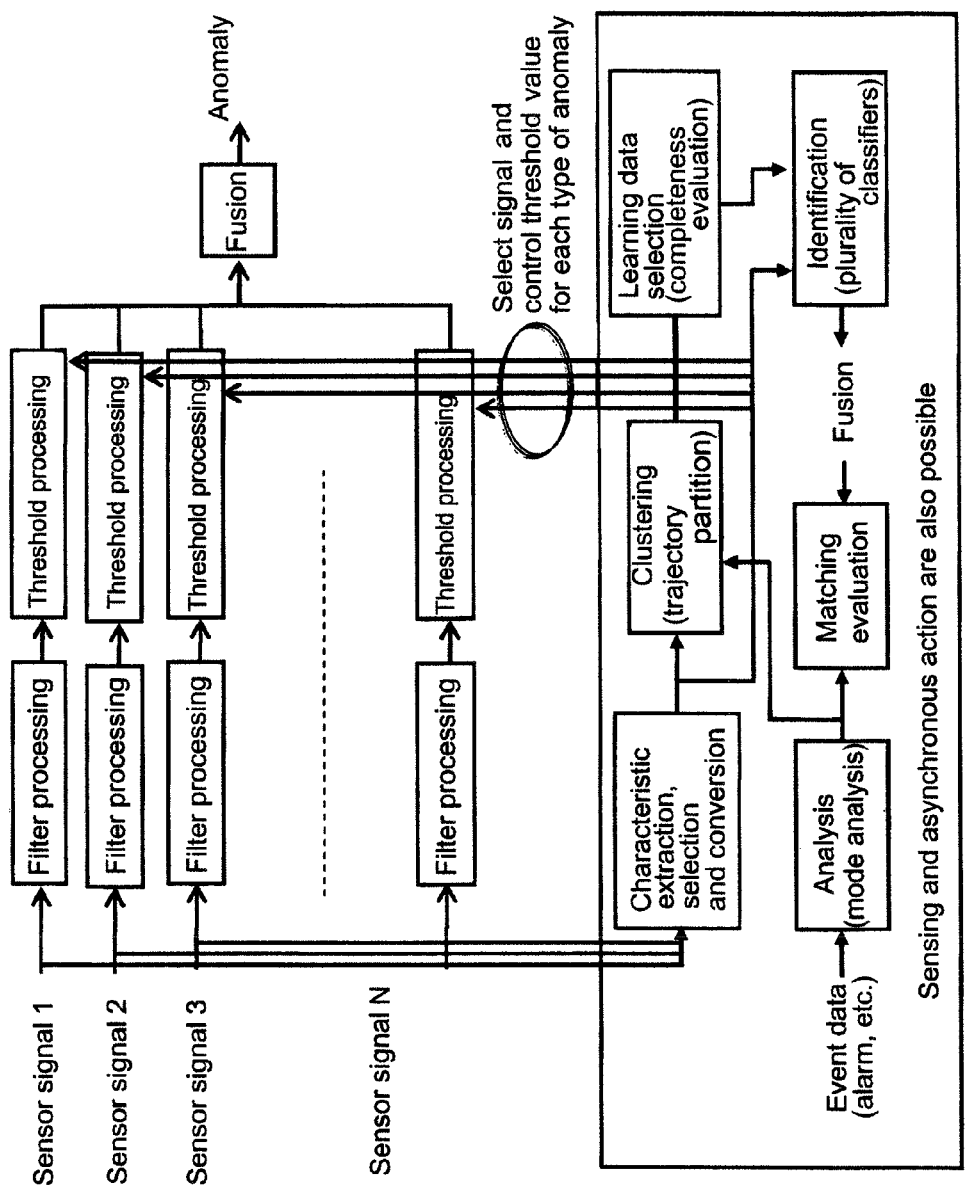
FIG. 5 is a configuration diagram of an anomaly detection system according to the present invention.

FIG. 5 illustrates an anomaly detection method according to the present invention. The upper section illustrates the design-based anomaly detection regarding individual sensor signals shown in FIG. 2, and the lower section illustrates the case-based anomaly detection through multivariate analysis of multi-dimensional sensor signals. The case-based anomaly detection is used to control the design-based anomaly detection. The case-based anomaly detection via multivariate analysis also enters event data. It performs mode decomposition of sensor signals. Clustering is the decomposition of sensor data into clusters. The points of the method are as follows.

1) The case-based anomaly detection via multivariate analysis of multi-dimensional sensor signals selects sensor signals and sets threshold values according to various types of anomalies. Specifically, anomaly detection (characteristic conversion), evaluation of level of effect of each signal, construction of determination conditions (rules) according to various types of anomalies, and selection and display of sensor signals corresponding to the anomaly are performed.

2) Design-based anomaly detection for individual sensor signals performs anomaly detection after the above process has been performed. Specifically, setting and control of thresholds, display of thresholds, and anomaly detection and display are performed.

FIG. 6 summarizes the basic concepts of the present invention. These concepts and operations are described in further detail in the following.

FIG. 7 illustrates an example of a sensor signal for design-based anomaly detection, a set threshold, and the result of anomaly detection. The threshold is provided by the designer. Since the sensor signal and the threshold satisfy a one-to-one relationship, they are easily comprehensible. The timing of anomaly detection is somewhat slow. A quicker detection leads to prevention maintenance, and early replacement of parts causing failure becomes possible. The reason why the threshold value is not appropriate is that the influence of work environment of the facility, the change in status due to the number of years of operation, the operation conditions and the influence of replacement of components are beyond the range of assumption of the designer.

Figure 8:
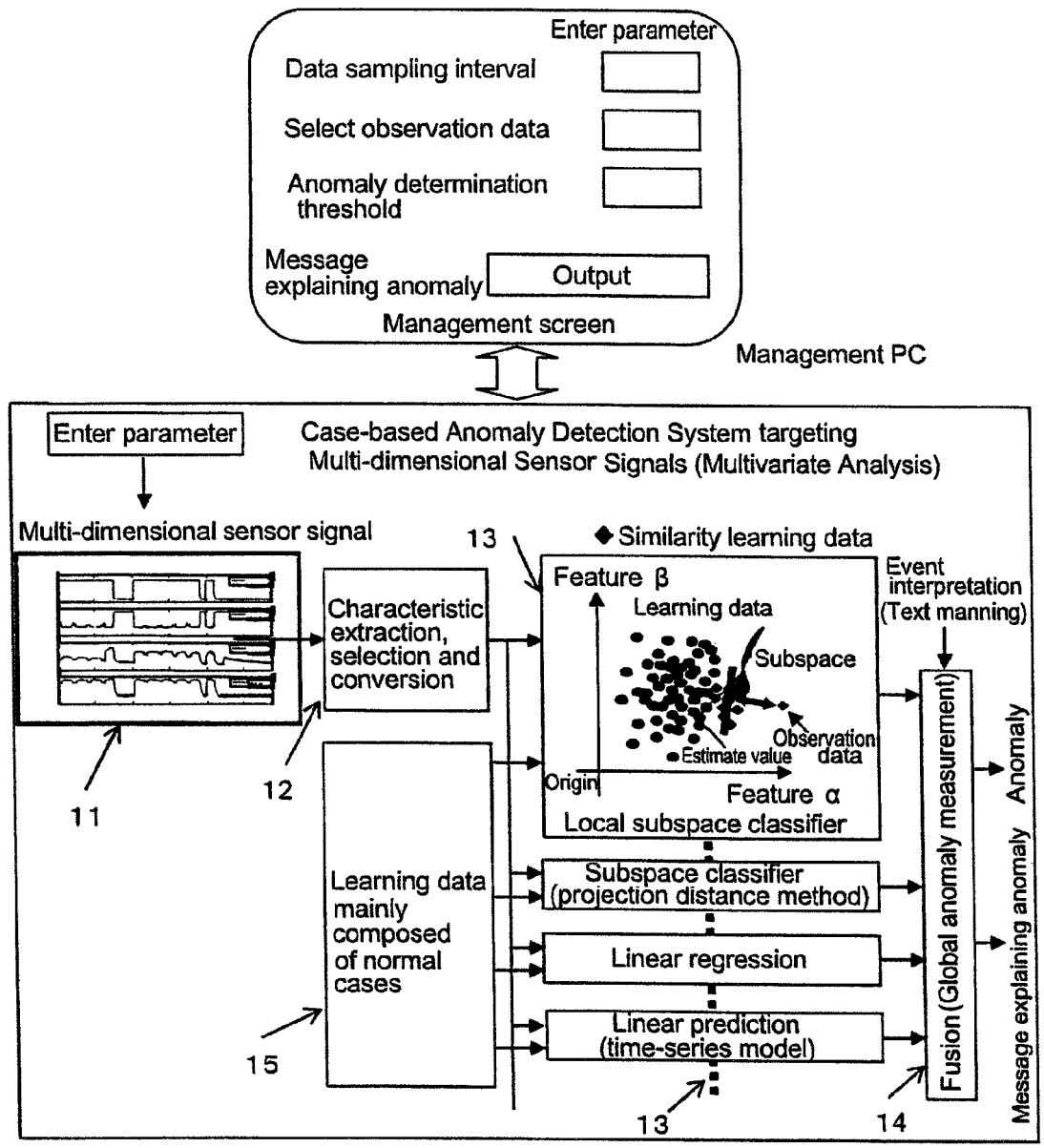
FIG. 8 is an explanatory view of case-based anomaly detection method using a plurality of classifiers.

Next, a case-based anomaly detection method will be described. FIG. 8 illustrates a case-based anomaly detection method. According to the anomaly detection, reference number 11 denotes a multi-dimensional time-series signal acquisition unit, 12 denotes a characteristic extraction, selection and conversion unit, 13 denotes a classifier, 14 denotes fusion (global anomaly measure), and 15 denotes a learning data mainly composed of normal cases.

The multi-dimensional time-series signals entered through the multi-dimensional time-series signal acquisition unit 11 has dimensions deleted via the characteristic extraction, selection and conversion unit 12, identified via a plurality of classifiers 13, and global anomaly measurement is determined via fusion (global anomaly measure) 14. The learning data 15 mainly composed of normal cases is identified via multiple classifiers 13 and used for determination of global anomaly measure, and the learning data 15 itself mainly composed of normal cases is also subjected to selection, which is accumulated and updated to improve the accuracy.

FIG. 8 illustrates a management PC through which the user enters the parameters. The parameters entered by the user are, for example, a data sampling interval, selection of observation data, and threshold values for anomaly determination. The sampling interval of data is for determining, for example, the seconds as the interval for acquiring the data. The selection of observation data is for determining which type of sensor signals should be mainly used. The anomaly determination threshold are threshold values in which the values of anomaly are thresholded described as computed residual or deviation from a model, outlier, discrepancy or misfit, or anomaly measurement.

The plurality of classifiers 13 illustrated in FIG. 8 can have a number of classifiers (h1, h2, . . . ) prepared and capable of acquiring a majority thereof (fusion 14). In other words, an ensemble (group) learning using various classifier groups (h1, h2, . . . ) can be applied. For example, the first classifier can adopt a projection distance method, the second classifier can adopt a local subspace classifier, and the third classifier can adopt a linear regression. An arbitrary classifier can be applied if it is based on case-based data.

FIG. 9 illustrates an example of the result of case-based anomaly detection. Sensor signals are the same as those shown in FIG. 7, but the anomaly measurement calculated via multivariate analysis targeting multi-dimensional time-series sensor signals is displayed. The anomaly measurement is obtained via FIG. 15 described in detail later. According to this example, the timing of anomaly detection is much earlier than the design-based anomaly detection timing.

However, the basis of triggering an anomaly alarm is not clear. Therefore, FIG. 9 illustrates the level of effect of sensor signals with respect to anomaly. If the signal is deviated from an average value, the signal indicates anomaly. In the drawing, the third signal from the bottom shows anomaly. Individual observation shows which sensor is related to anomaly. However, in many cases, a plurality of sensor signals represent anomaly, so that the analysis thereof may apply extra strain on the system.

Figure 10:
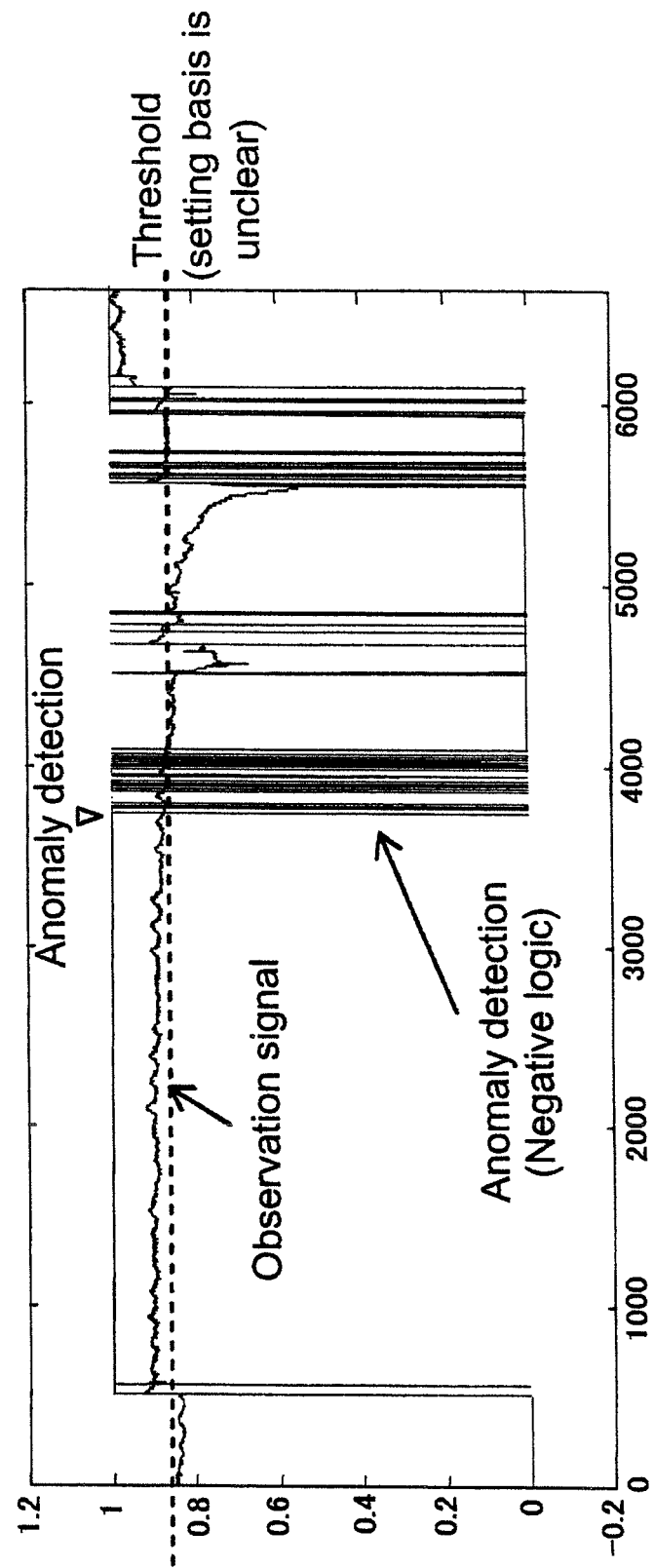
FIG. 10 shows an example for controlling threshold values via individual detection so that the result approximates the result of case-based anomaly detection.

FIG. 10 is an example having hastened anomaly detection by controlling threshold values in FIG. 8. In this case, it can be said that appropriate anomaly detection is realized. However, since the setting of threshold values is performed manually and therefore artificial, the basis of setting is unclear.

Figure 11:
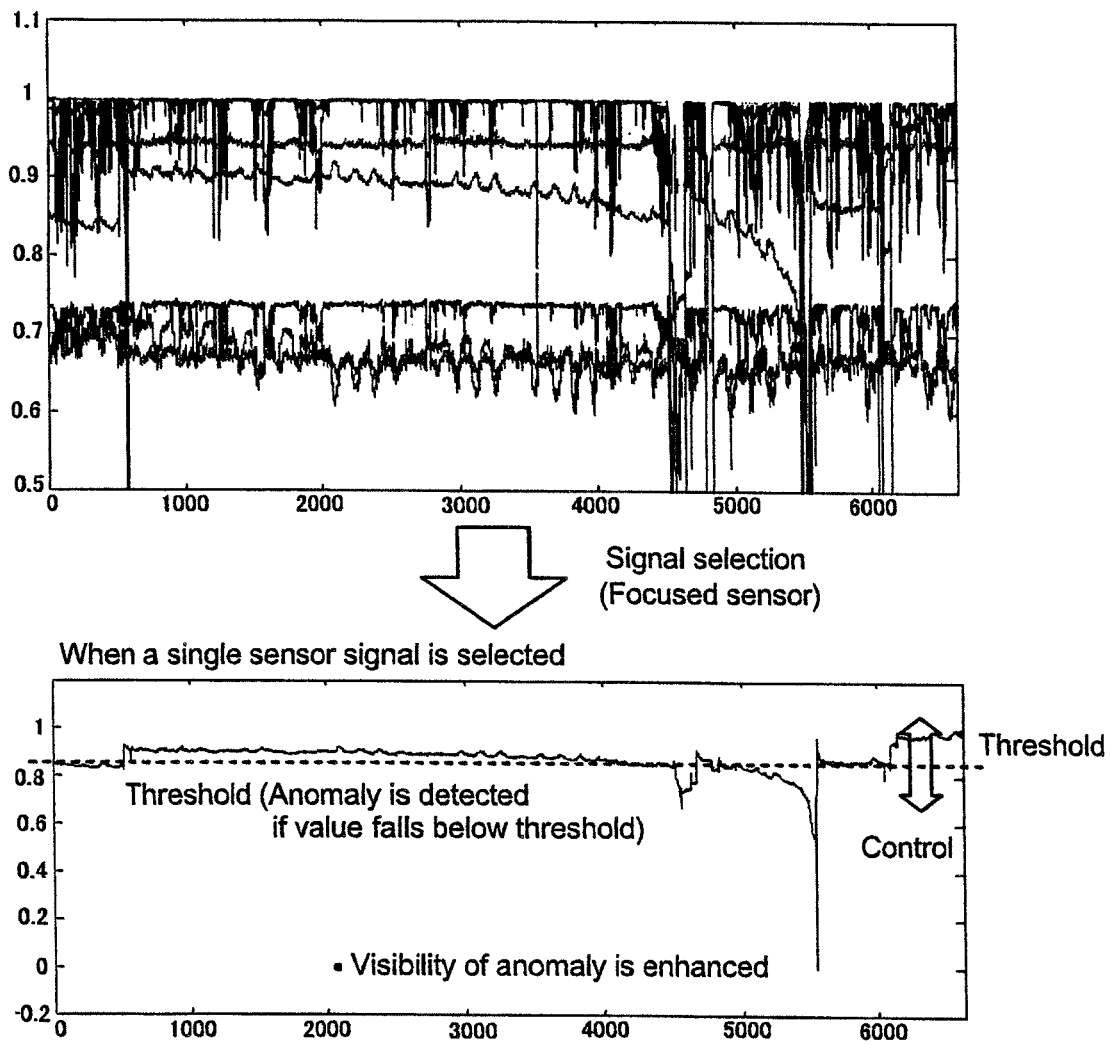
FIG. 11 shows an example of selecting observation signals and controlling threshold values based on the result of case-based anomaly detection.

FIG. 11 utilizes the result of case-based anomaly detection and selects sensor signals using the level of effect of sensor signals to anomaly, and thereafter, controls threshold values to detect anomaly. It reflects the operation environment of the facility, the change in status due to operation years, the conditions of operation or the influence of replacement of components, wherein the basis of settings of threshold values is provided. The visibility of anomaly is also enhanced.

Figure 12:
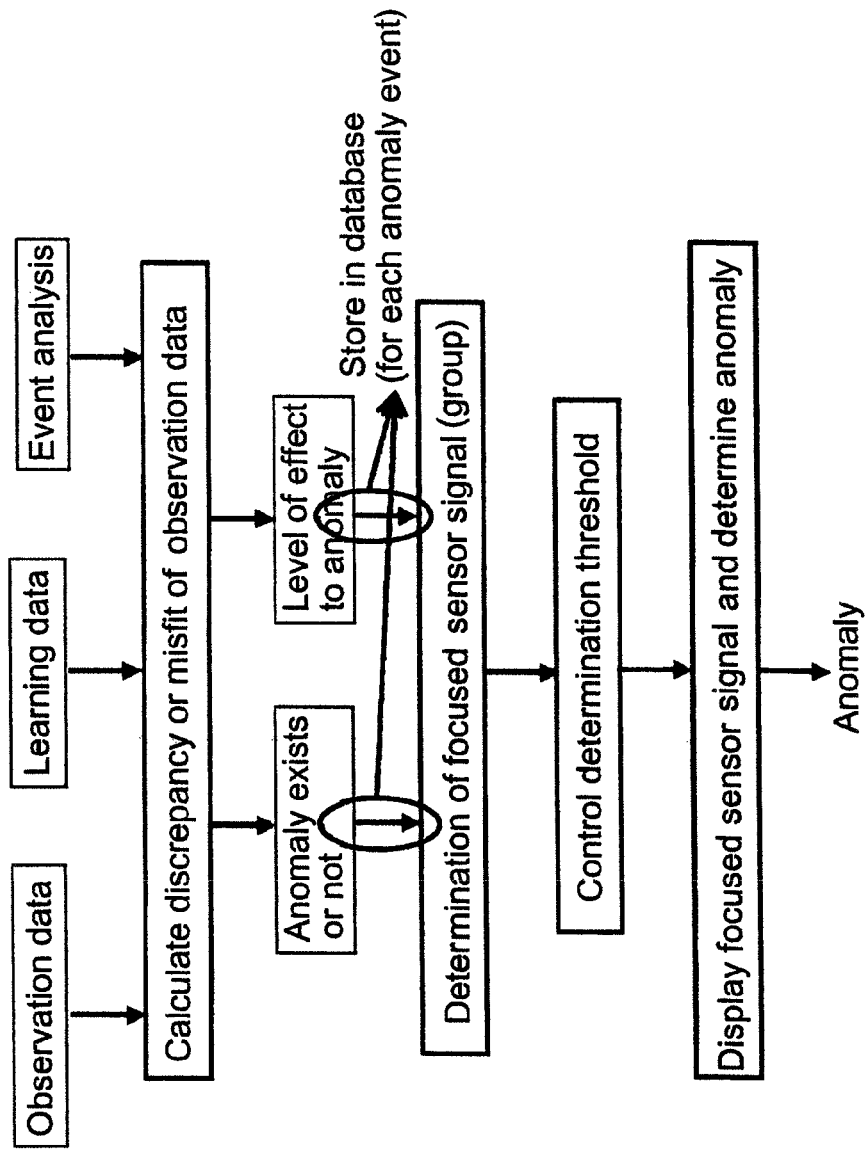
FIG. 12 shows an operation flowchart according to the present invention.
Figure 13:
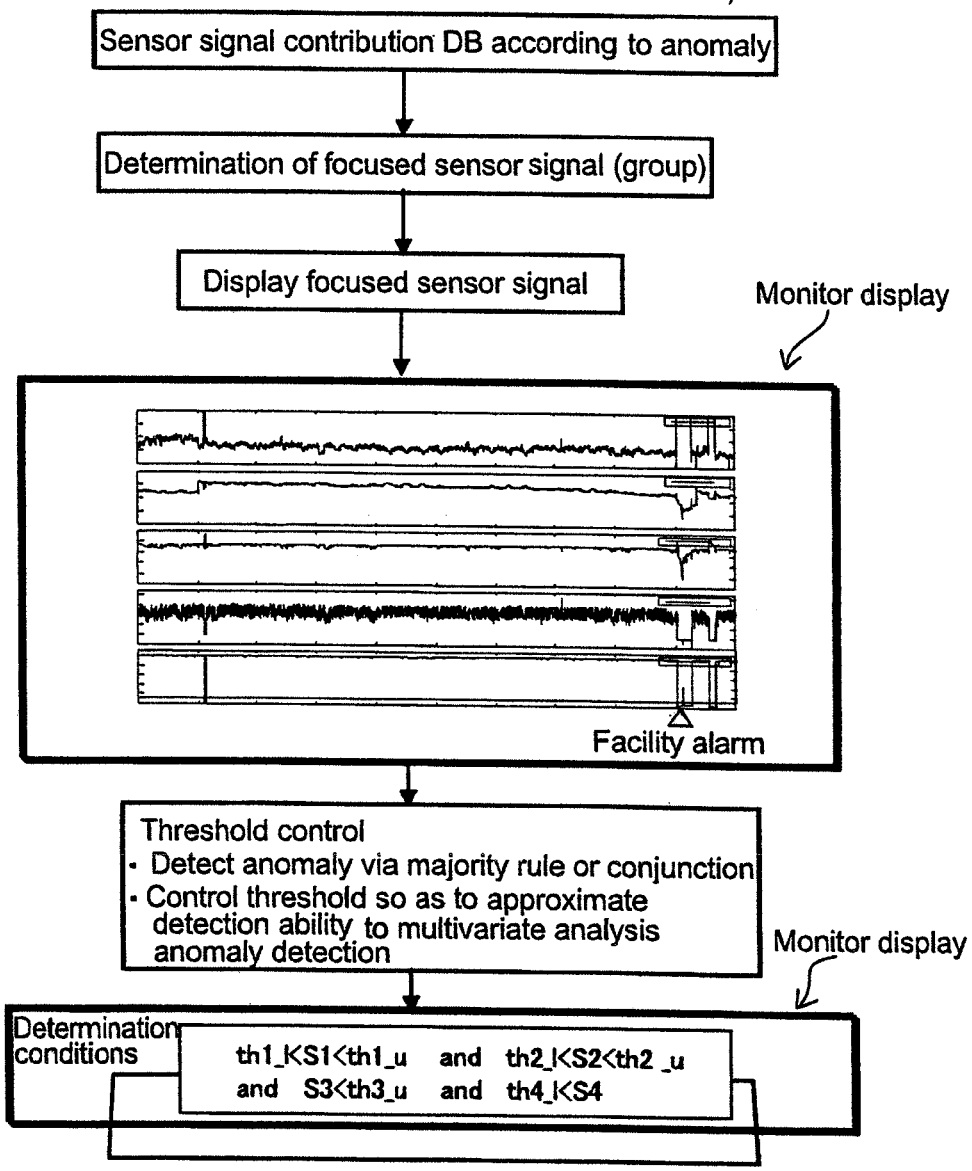
FIG. 13 shows an operation flowchart according to the present invention.

FIGS. 12 and 13 illustrate the flow of the above operation. In FIG. 12, at first, the discrepancy or misfit (similarity) of the observation data and the learning data is computed using the result of observation data, learning data and event analysis. Event data (such as alarm information) is used for example for selecting learning data. Next, whether anomaly exists or not is determined based on the discrepancy or misfit (similarity) of observation data and learning data (threshold is set from the exterior). At the same time, the level of effect of anomaly is calculated.

Now, the identification of observation data is performed using the average of k-nearest neighbor data of each class and the distance of observation data (called LAC method). Thus, the graph on the lower area of FIG. 9 is obtained. Next, the relevant sensor signal is selected based on the various anomaly and the level of effect of anomaly. In some cases, it is necessary to accumulate the various anomalies and anomaly influence rates as database. The result of detection of anomaly is used for controlling the threshold values with respect to each of the original sensor signals. In other words, the threshold values are controlled so that substantially same sensitivity is acquired.

Thus, the graph illustrated in FIG. 11 is obtained. Erroneous detection may occur if the sensitivity is set so as not to overlook any anomaly, but the present embodiment assumes that such erroneous detection is okay. Similar threshold values are set to the selected plurality of sensor signals. At this time, the threshold values are determined so as to prevent the occurrence of erroneous detection as much as possible by adopting majority rule or the conjunction of the selected plurality of sensor signals for anomaly detection. Then, these logics are displayed together with the result of anomaly detection. The logics such as the majority rule and the conjunction of anomaly detection of the selected plurality of sensor signals are set as determination conditions (rules).

Determination Conditions: Conditions such as the majority rule or the conjunction of the result of threshold processing of selected sensor signals Since each sensor signal represents specific physical quantities such as the temperature or pressure of cooling water, the power generation current or the power generation voltage, by setting threshold values for each of the sensor signals, significant advantages are achieved since the designer can easily comprehend physical limits leading to anomaly, easily visually capture the anomalous phenomenon and easily correspond to the principle of operation or the physical phenomenon of the facility. The determination conditions (rules) obtained with respect to the individual sensor signals are externally displayed or output.

Further, the result of anomaly detection illustrated in FIG. 11 is also displayed on a monitor or the like. In case-based anomaly detection via multivariate analysis, the result is often displayed via linear coupling of the plurality of sensor signals. In that case, interpretation of the result is difficult if the result is a linear coupling of the cooling water temperature and power generation current, for example. Linear coupling realizes a significant advantage in that the linkage between sensor signals can be recognized and a network can be constituted, however, there is a gap between linear coupling and the direct understanding by the maintenance engineers and customers. Therefore, it is important to derive and clarify the above-described determination conditions from the viewpoint of capturing an event easily through the variation of individual sensor signals or explaining an event based on a combination of a small number of sensor signals.

The case-based anomaly detection through multivariate analysis targeting multi-dimensional sensor signals can be performed non-synchronously with the sampling of data since there is no need to realize constant linkage (synchronization), so that conversely, the sensitivity of anomaly detection can be further enhanced by adopting a complex anomaly detection method requiring a heavy operation load with respect to the data quantity that requires a long processing time of anomaly detection compared to the data sampling time. Desynchronization is important regarding a speedy sampling having a 1 ms cycle, for example. On the other hand, anomaly detection and sampling of data can be performed synchronously in detecting a degradation-type anomaly which requires anomaly detection in units of days where speedy processing is not required.

FIG. 13 illustrates an example of the selected sensor signals. Further, threshold values $th1\_l$, $th1\_u$, $th2\_l$, $th2\_u$, $th3\_u$, $th4\_l$ and the like are set with respect to each of the selected sensor signals S1, S2, S3, S4 and the like. In the present example, anomaly is detected through conjunction of the result of threshold processing of each of the selected sensor signals (binary logic). These are set as the determination conditions (rules) of anomaly detection. The threshold values $th1\_l$, $th1\_u$, $th2\_l$, $th2\_u$, $th3\_u$, and $th4\_l$ are approximated to realize a detection ability similar to anomaly detection via multivariate analysis. They may not be completely consistent, but the values can be set so as not to miss any anomaly.

$th1\_l < S1 < th1\_u$ and $th2\_l < S2 < th2\_u$ and $S3 < th3\_u$ and $th4\_l < S4$ As described, the present embodiment aims at improving the sensitivity, the visibility of anomaly detection and facilitating interpretation thereof, but another problem arises in that it is necessary to cope with a variety of anomalies. It is possible that the plurality of sensor signals being selected varies according to the type of anomaly. Therefore, it may be possible to store the selection of sensor signals and set threshold values for each type of anomaly based on past events and to utilize the same. In this case, a plurality of selections and a plurality of threshold values are indicated. Such database composed of anomaly cases, level of effect of sensor signals and selection results may also be used as an effective material of determination in anomaly diagnosis/prognosis.

Figure 14:
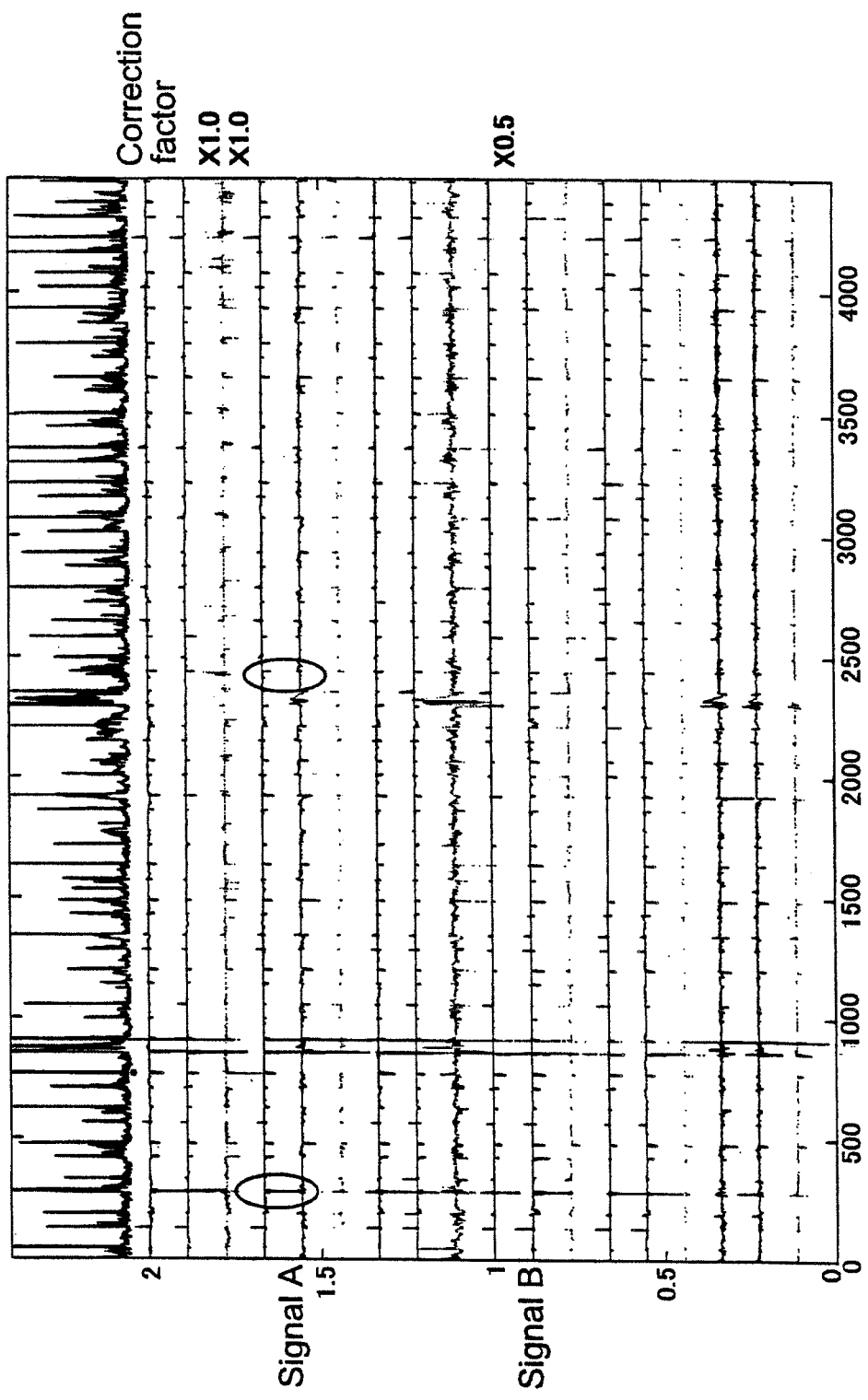
FIG. 14 shows another example of level of effect according to the present invention.

FIG. 14 illustrates another example of evaluation of the level of effect. In FIG. 14, variation exists in signal A, and a predictor of anomaly has occurred. However, variation can be seen in other sensor signals such as signal B. According to multivariate analysis, it is determined that the level of effect of signal B is high. However, even after performing canonicalization for normalizing the difference in scales of the signals via standard residual, it is not always possible to match the scales of the signals precisely. The reason is because the ON and OFF states of the signals exist in a mixture, and therefore, it becomes difficult to normalize the variation of the ON state.

At minimum, it is necessary to distinguish the ON state and the OFF state (the handling of the transition period is still unclear), but a problem of completeness exists in which the learning data does not completely cover all cases, and in the case of FIG. 14, the level of effect of signal B is actually not high. In such case, based on design information, it is possible to determine that even if the variation of signal B is significant, there will not be any problem. Therefore, it is possible to perform selection of sensor signals by taking the design information into consideration. Specifically, signals are selected by setting correction factors and applying the correction factors to the level of effect while considering design information.

Figure 18:
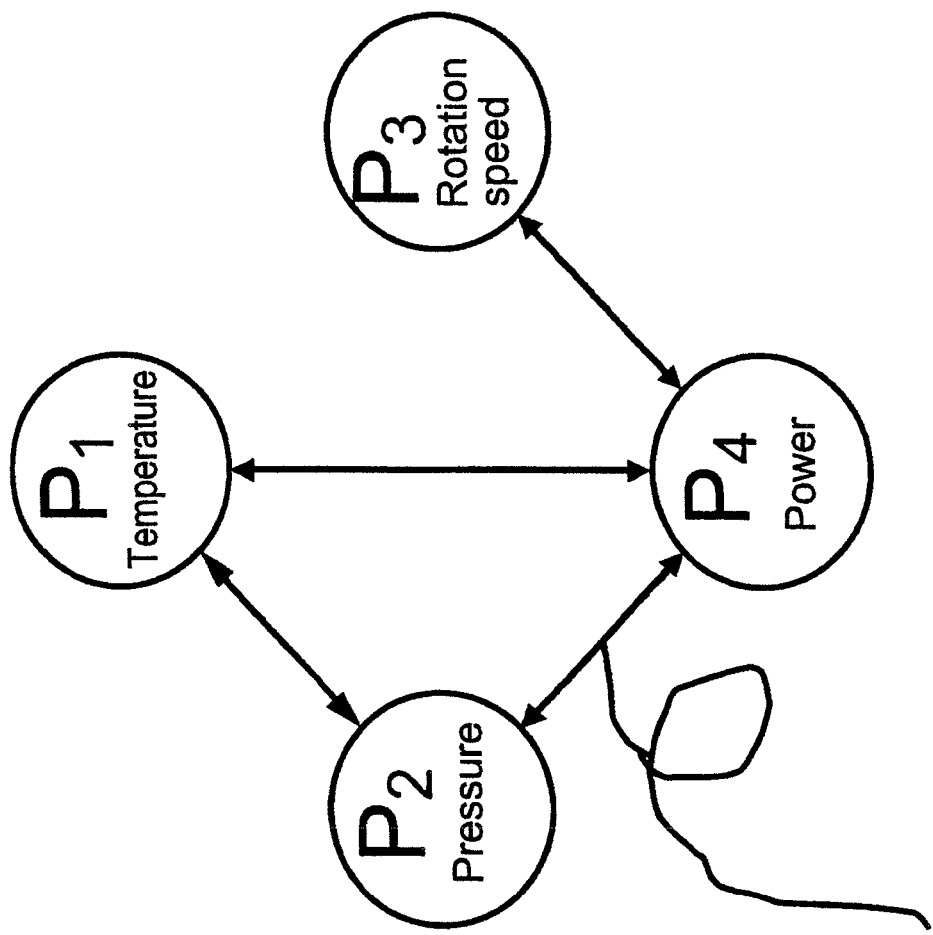
FIG. 18 illustrates a network of sensor signals according to the present invention.

The selected sensor signals being adjusted by the factors indicate that there is a strong conjuncture when anomaly occurs, and thus, they are useful information. The target facility can be modeled by collecting such sensor signals for each case. FIG. 18 shows an example in which a network of sensor signals is created based on the level of effect information of each sensor signal to anomaly. Regarding basic sensor signals representing temperature, pressure and power, weight can be added to sensor signals based on the ratio of level of effect of signals to anomaly. By creating such relevance network, it becomes possible to clarify the compatibility, the co-occurrence or the correlativity among signals unintended by the designer, which is also useful for diagnosis/prognosis of anomaly. The network can be generated not only regarding the level of effect of each sensor signal to anomaly but also from the viewpoint of correlation, similarity, distance, causal connection, progression/delay of phase and so on.

Figure 15:
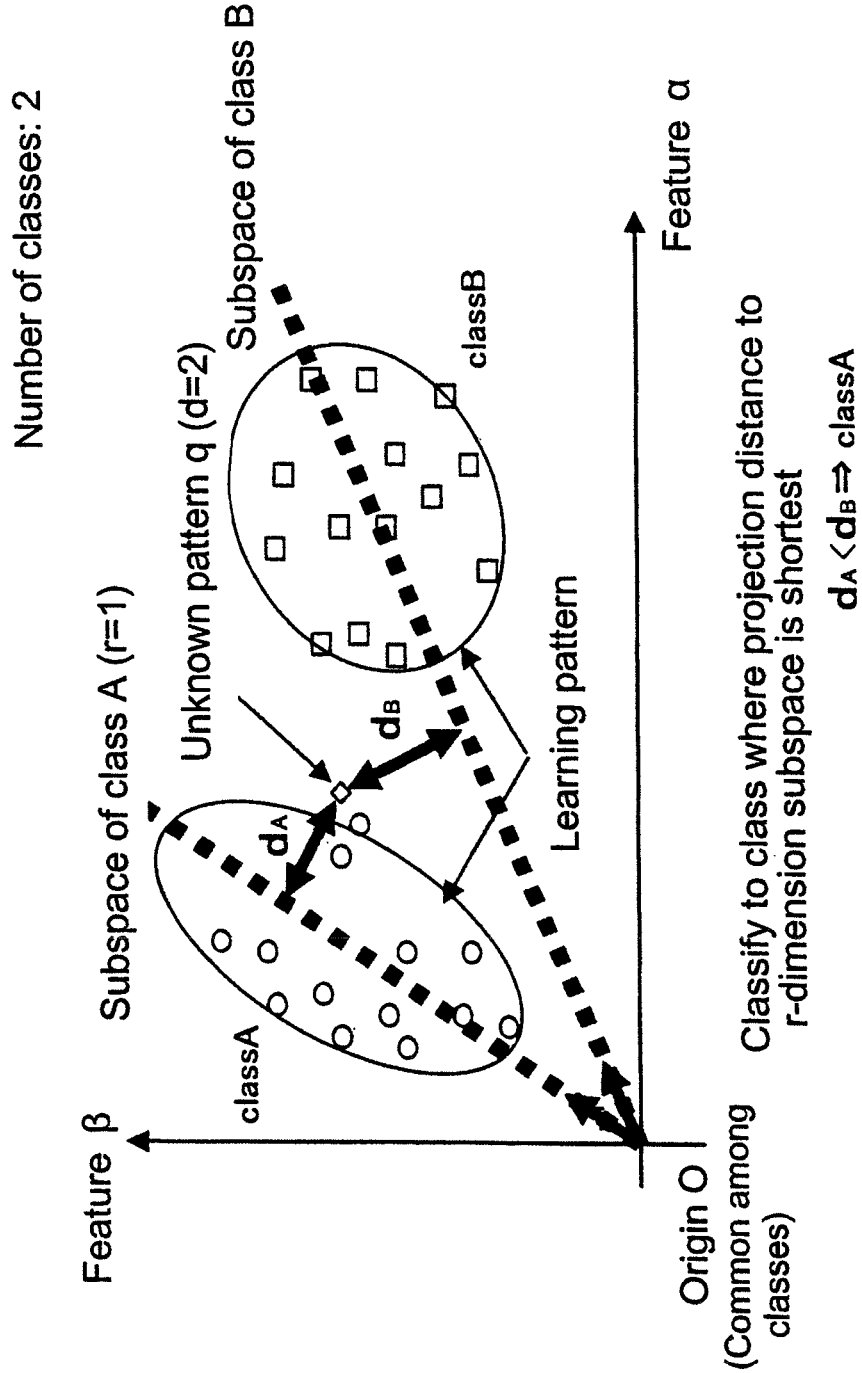
FIG. 15 is an explanatory view of one method of subspace classifier according to the present invention.

Regarding the target facility model; network of the selected sensor signals, a common CLAFIC method is illustrated in FIG. 15. FIG. 15 acquires the residual from the model. FIG. 15 illustrates an example of a two class, two dimensional pattern. The subspace of each class, that is, the subspace represented by a one-dimensional straight line, is acquired.

Generally, an eigenvalue decomposition of autocorrelation matrix of the data of each class is performed to obtain an eigenvector as basis. Eigenvectors corresponding to a few of the highest eigenvalues having a high value are used. When an unknown pattern q (latest observation pattern) is entered, the system computes the length of orthogonal projection to subspace, or the projection distance to the subspace. Then, the system classifies the unknown pattern (latest observation pattern) q to a class in which the length of the orthogonal projection is maximum or the projection distance is short.

In FIG. 15, the unknown pattern q (latest observation pattern) is classified into class A. In the multi-dimensional time-series signals shown in FIG. 1, a single class identification becomes an issue since a normal section is basically targeted, so that class A is set as the normal section and the distance from the unknown pattern q (latest observation pattern) to class A is computed and set as residual. Then, if the residual is high, the system determines that the value is an outlier. In such subspace classifier, even if a few abnormal values are mixed in the signals, the influence thereof is lessened when dimension reduction is performed and a subspace is created. This is an advantage of applying a subspace classifier.

Incidentally in a projection distance method, the median point of each class is set as the origin. The method utilizes the eigenvector obtained by applying a KL expansion to the covariance matrix of each class as basis. A variety of subspace classifiers have been provided, but as long as it has a distance scale, the deflection level can be calculated. Also in the case of density, the deviation level can be determined based on the value of density. The CLAFIC method adopts a similarity scale since the length of the orthogonal projection is obtained.

As described, the present method computes the distance or the similarity in subspace so as to evaluate the degree of deviation. According to a projection distance method and other subspace classifiers, the classifier is based on distance, so that metric learning for learning distance functions or vector quantization for updating dictionary patterns can be applied as the learning method in the case where anomaly data can be utilized.

Further, it is also possible to apply a method called a local subspace classifier in which a k-number of multi-dimensional time-series signals close to the unknown pattern q (latest observation pattern) are obtained, a linear manifold is generated in which the nearest neighbor pattern of each class is set as the origin, and the unknown pattern is classified to the class where the projection distance to that linear manifold becomes minimum (refer to the area shown within the frame of the local subspace classifier of FIG. 8). The local subspace classifier is one type of subspace classifier.

The reference character k refers to a parameter. In anomaly detection, a single class identification becomes an issue as mentioned earlier, so that the class A in which a great majority of data belongs is set as the normal section, and the distance from the unknown pattern q (latest observation pattern) to class A is computed and set as the residual.

According to this method, for example, it becomes possible to compute as an estimate value the orthogonal projection point from the unknown pattern q (latest observation pattern) to the subspace formed by using k-number of multi-dimensional time-series signals (the data set as estimate values illustrated within the frame of the local subspace classifier of FIG. 8). It is also possible to compute the estimate value of each signal by sorting the k-number of multi-dimensional time-series signals in the order closest from the unknown pattern q (latest observation pattern) and adding weight in inverse proportion to the distance thereof. The estimate values can also be computed in a similar matter through projection distance method and the like.

Normally, a single type of parameter k is determined, but a more effective method can be obtained by performing the process while varying the parameters k a few times, since the target data can be selected with respect to similarity and a comprehensive determination can be realized based on these results. Furthermore, since the normal section is in a variety of states including the transition period between ON and OFF of the facility, so that whenever an observation data is entered, a learning data similar to the observation data is selected sequentially based on the distance from the observation data. Further, it is possible to gradually increase the number of learning data from the minimum number to a selected number, and to select the data in which the projection distance is minimum. This method can also be applied to the projection distance method. In that case, the clustering illustrated in FIG. 8 becomes unnecessary.

In a local subspace classifier, even if a small number of abnormal values are mixed in, the influence thereof is significantly reduced when a local subspace is adopted.

It is possible to obtain a k-number of multi-dimensional time-series signals close to the unknown pattern q (latest observation pattern), determine that the cluster in which the largest number from k number of signals belongs is the cluster in which the unknown pattern q exists, and obtain an L-number of multi-dimensional time-series signals close to the unknown pattern q again targeting the learning data belonging to this cluster to thereby apply the local subspace classifier thereto.

Further, a classifier such as a single class support vector machine can also be applied if the issue is considered as merely a single-class identification. In that case, kernelization such as a residual basis function for mapping the data in high-order space can be applied. In a single class support vector machine, the side closer to the origin is determined as the outlier, that is, abnormal. However, the support vector machine can cope with a high feature quantity dimension, but it has a drawback in that when the number of learning data is increased, the amount of calculation becomes enormous.

Thus, a method disclosed for example in "IS-2-10 Takekazu Kato, Mami Noguchi, Toshikazu Wada (Wakayama University), Kaoru Sakai and Shunji Maeda (Hitachi); One-class classifier based on pattern proximity" disclosed in MIRU 2007 (Meeting on Image Recognition and Understanding 2007) can be applied, and in that case, there is a merit in that the increase in the number of learning data does not lead to enormous amount of calculation.

Thus, by presenting the multi-dimensional time-series signals in a low-dimensional model, it becomes possible to decompose a complex status and to express the status in a simple model, so that the phenomenon can be easily comprehended. Further, since a model is set, it is not necessary to acquire a complete data as in the method provided by SmartSignal Corporation. The present method is advantageous since it allows missing of data.

Figure 16:
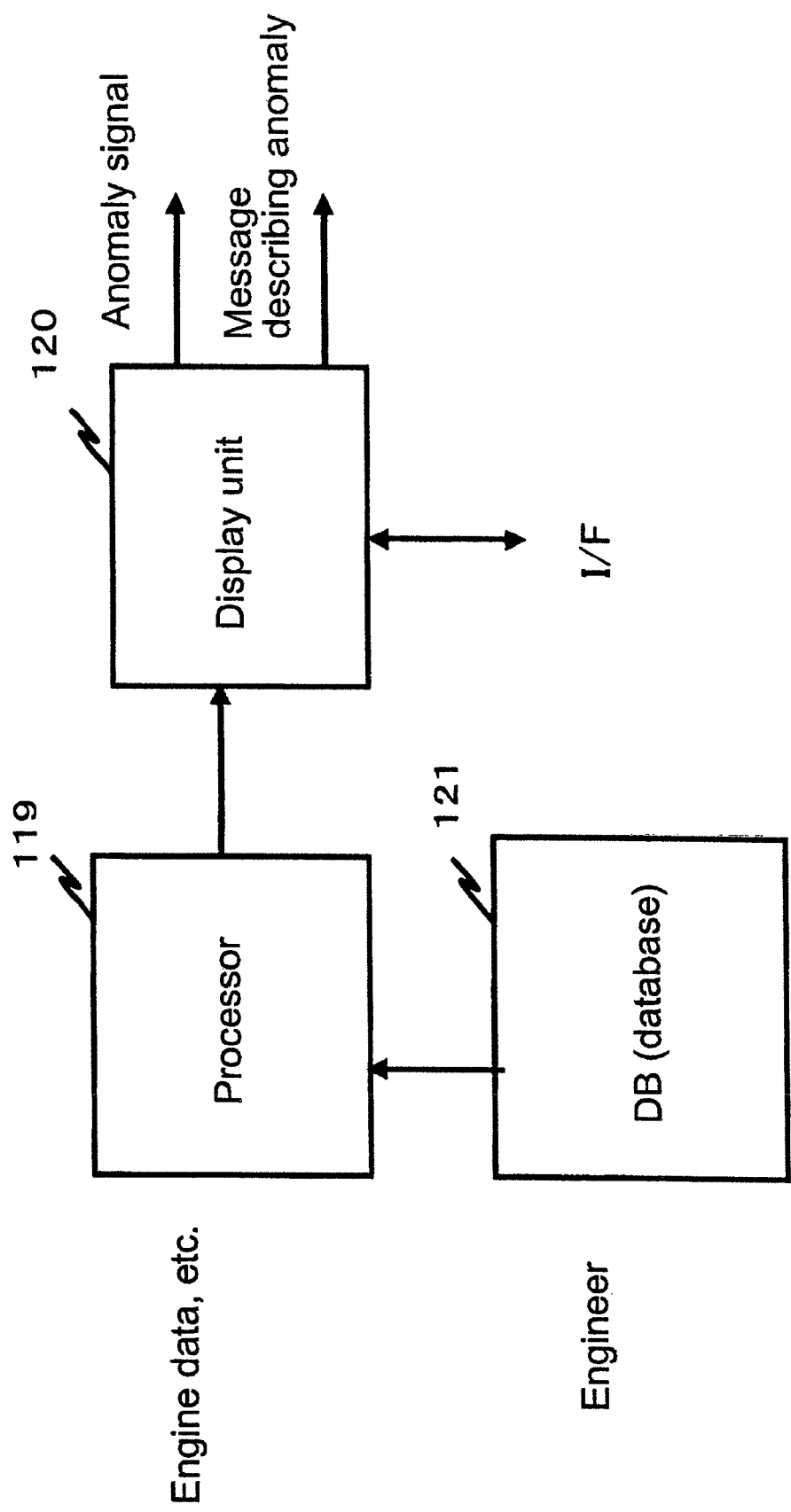
FIG. 16 is a configuration diagram of the periphery of the processor executing the present invention.

FIG. 16 shows a hardware configuration of the anomaly detection system according to the present invention. The system enters a sensor data of an engine or the like set as target to a processor 119 for executing anomaly detection, where missing values or the like are restored, and the value is stored in a database DB 121. The processor 119 utilizes the DB data composed of an acquired observation sensor data and learning data to execute anomaly detection. A display unit 120 includes various displays and outputs whether anomaly signals exist or not and a message for explaining anomaly as described later. The display unit can also display trend. The display unit can also display the result of interpretation of an event.

In addition to the above-described hardware, it is possible to provide a program to be installed thereto to the customers via media or online service.

Skilled engineers and the like can manipulate the database DB 121. Especially, the database can teach and store anomaly cases and countermeasures thereto. The database stores (1) learning data (normal), (2) anomaly data and (3) contents of countermeasures. Since the database DB is designed to be manipulated by experienced engineers, a more refined and useful database can be acquired. The manipulation of data is performed by automatically moving the learning data (such as individual data and the median point position) when an alarm occurs or when parts are replaced. It is also possible to add the acquired data automatically. If anomalous data exists, it is possible to apply a method such as generalized vector quantization for moving data.

Figure 17:
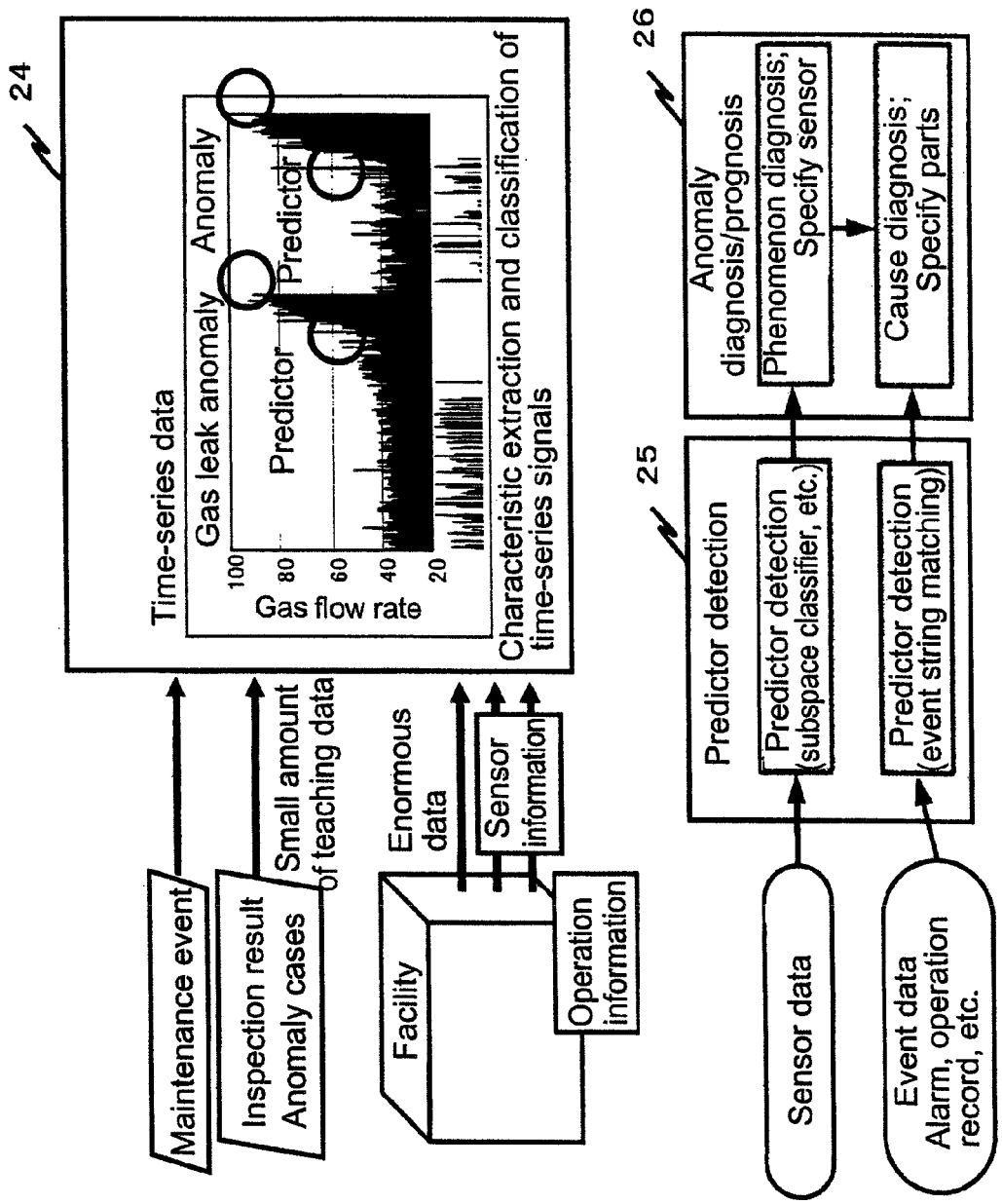
FIG. 17 is a view showing an overall configuration of the present invention.

FIG. 17 illustrates anomaly detection and diagnosis/prognosis after anomaly detection. In FIG. 17, anomaly detection is performed through characteristic extraction and classification 24 of time-series signals from the time-series signals output from the facility. The number of facilities can be more than one. A facility including a plurality of systems can be set as the target. At the same time, supplemental information such as the maintenance event of each facility (such as an alarm or an operation record, specifically, the starting and stopping of the facility, the setting of operation conditions, various failure information, various alarm information, periodic inspection information, operation environments such as the set temperature, accumulated time of operation, components replacement information, adjustment information, cleaning information and so on) is acquired so as to detect anomaly with high sensitivity.

As shown in the drawing, if predictor detection 25 discovers a predictor at an early stage, certain measures can be taken before the facility malfunctions and stops operation. Predictor detection is performed using a subspace classifier and the like and determination on whether a predictor exists is performed comprehensively by additionally adopting an event string matching, for example, and based on the predictor, anomaly diagnosis/prognosis is performed so as to specify failure candidate components and to estimate when the component malfunctions and stops. The arrangement of necessary components are performed at necessary timings in response thereto.

In order to facilitate understanding, the anomaly diagnosis/prognosis 26 can be classified into a phenomenon diagnosis/prognosis for specifying the sensor containing the predictor and a cause diagnosis/prognosis for specifying the component possibly causing failure. The anomaly detection section outputs a signal representing whether anomaly exists or not and also an information related to characteristic quantity with respect to the anomaly diagnosis/prognosis section. The anomaly diagnosis/prognosis section performs diagnosis/prognosis based on these information.

Figure 19:
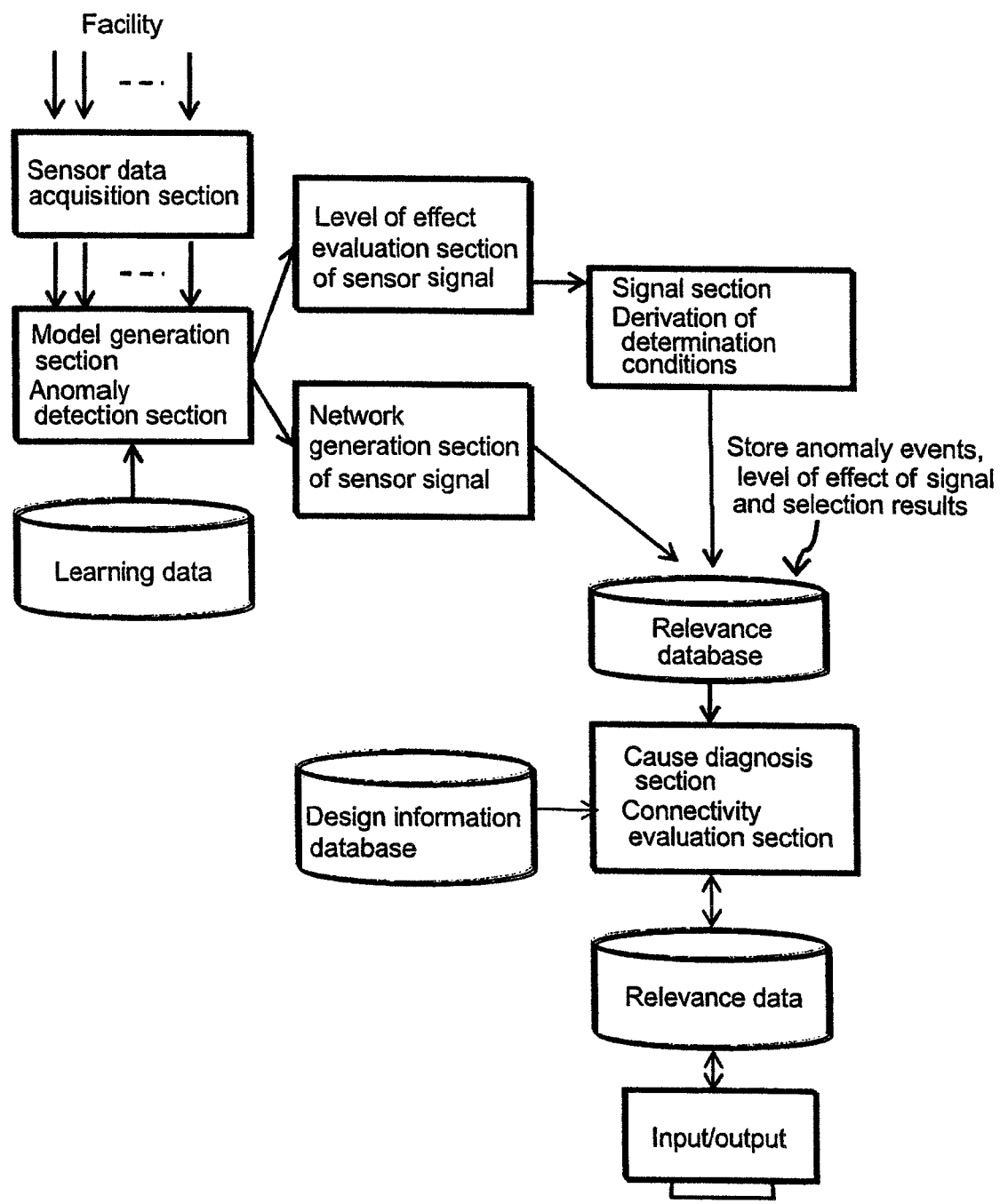
FIG. 19 shows the configuration of anomaly detection and cause diagnosis/prognosis according to the present invention.

FIG. 19 illustrates the configuration related to the section of anomaly detection and cause diagnosis/prognosis. FIG. 19 is composed of a sensor data acquisition section for acquiring data from a plurality of sensors, a learning data composed mainly of normal data, a model generation section for modeling learning data, an anomaly detection section for detecting whether anomaly exists or not in the observation data based on the similarity of observation data and modeled learning data, a level of effect evaluation section for evaluating the level of effect of each sensor signal, a sensor signal network generation section for creating a network diagram representing the relevance of each sensor signal, a relevance database composed for example of anomaly events, level of effect of each sensor signal and selection results, a design information database composed of design information of the facility, a cause diagnosis/prognosis section, a relevance database for storing the diagnosis/prognosis result, and an input/output.

Figure 21:
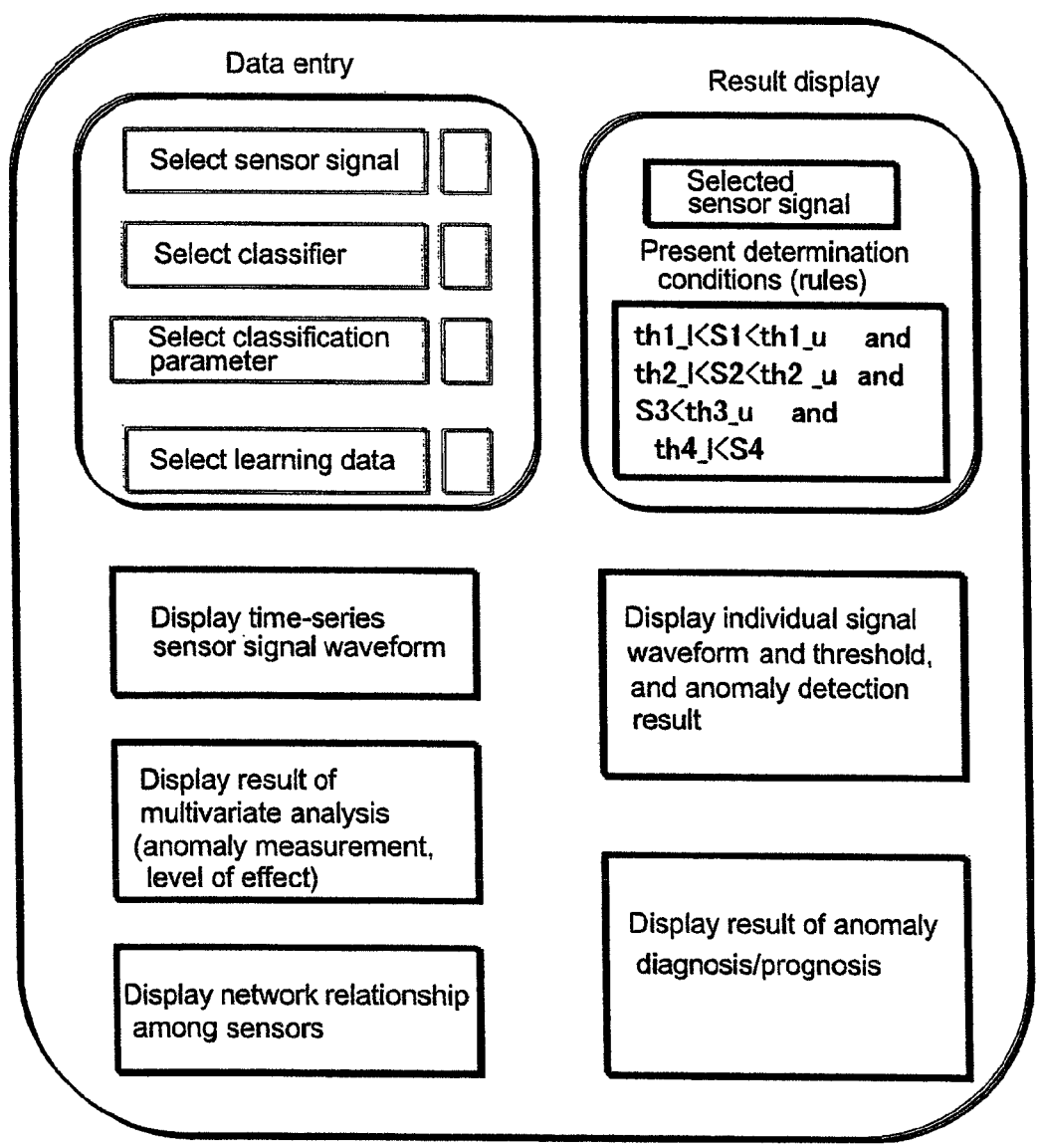
FIG. 21 is a view showing one example of a graphic user interface GUI according to the present invention.

Information other than design information is included in the design information database, and in the example of an engine, it includes information on the year, the model, the components illustrated in FIG. 21, bill of materials (BOM), past maintenance information (contents of on-call, sensor signal data when anomaly occurs, adjustment date, image data, abnormal noise information, replacement component information and so on), a cause diagnosis/prognosis tree (which is a simplified tree created by the designer, which is branched in correspondence to cases to specify units or components to be replaced), operation status information, inspection data taken at the time of shipping and installation. The component illustrated in FIG. 20 is information related to electric component blocks.

The characteristics of this configuration is to tie the sensor signals and component information using the network representing the relevance of each sensor signal with the aim to support the diagnosis/prognosis of cause. The network representing the relevance of each sensor signal generated from the level of effect of sensor signals is used as the material of knowledge for cause diagnosis/prognosis. In the diagnosis/prognosis, when a phenomenon occurs, a list of possible countermeasures is presented based on the connectivity among elements representing phenomenon, sections and treatments within a plurality of cases (ambiguous expression). Specifically, in the example of a medical equipment, for example, in response to a phenomenon in which a ghost occurs in an image, a network representing relevance of the respective sensor signals is used to connect the phenomenon with a cable which is one of the components, so as to present a cable shield processing in the list of possible countermeasures.

FIG. 21 illustrates one example of a graphical user interface (GUI). Users enter necessary items regarding selection of sensor signals for eliminating sensor signals that vary monotonously or sensor signals with a small dispersion, selection of classifiers used for multivariate analysis (such as local subspace classifier or projection distance method), selection of identification parameters of the classifier, and selection of learning data from a plurality of learning data prepared in response to each season to cope with seasonal variation and the like. After execution, anomaly measurement or the result of evaluation of level of effect of each sensor signal are displayed as a result of multivariate analysis. At the same time, the network relationship of each sensor signal is displayed (one example of which is shown in FIG. 18).

Based on the result of multivariate analysis, a sensor signal to be focused and selected is selected based on the anomaly, and the result of selection is displayed. Further, the determination conditions (rules) with respect to individual sensor signals are displayed. Based on the determination conditions, the individual signal waveform and threshold values are displayed based on the determination conditions, and the result of anomaly detection with respect to the selected signal waveform are displayed. Lastly, the result of anomaly diagnosis/prognosis is displayed.

FIG. 22 illustrates an explanatory view of the art of predictor detection when anomaly occurs via a residual time-series pattern. FIG. 22(a) shows a method for calculating similarity of the residual time-series pattern, and FIG. 22(b) shows residual signals of observation data corresponding to FIG. 22(a).

Point "0" of space of FIG. 22(a) corresponds to the normal median point of each observation data computed via the local subspace classifier shown in FIG. 8, wherein the residual from the normal median point of sensor signal A, sensor signal B and sensor signal C at each point of time are shown as trajectory within the space. In FIG. 22(a), residual series of observation data at the elapse of time t−1, time t and time t+1 are shown via arrows.

The similarity of observation data and each anomaly event can be estimated by computing the inner product (A, B) of each residual. Further, it is also possible to divide the inner product (A, B) by the size (norm) and estimating the similarity based on angle θ.

Similarity is computed with respect to the residual time-series pattern of observation data, and based on the trajectory, the anomaly predicted to occur is estimated. Specifically, FIG. 22(a) shows the residual of anomaly case A, the residual of anomaly case B and the residual of anomaly case C. Upon observing the residual time-series pattern of observation data shown by the dotted arrow line, the data approximates anomaly case B at time t, but based on the trajectory, it is possible to predict the occurrence of anomaly case A, and not anomaly case B.

In order to predict anomaly cases, the residual time-series trajectory data to the time when anomaly case occurs is stored in a database, and the similarity between a residual time-series pattern of observation data and the time-series pattern of trajectory data stored in the trajectory database is computed to detect a predictor of occurrence of anomaly.

Further, in the case of anomaly of a composite event, vector summation operation of each event of the composite event is performed so as to detect the predictor of occurrence of anomaly of a composite event (simulation of a composite event that has not occurred).

FIG. 22(b) shows the temporal development of residual signals of a plurality of observation data corresponding to sensor signals A, B, C and the like of FIG. 22(a). An anomaly occurs at time 11/17 at the upper section of FIG. 22(b) in which the jacket water pressure drops, for example, wherein the predictor of occurrence of a specific anomaly can be detected by detecting the residual signals of observation data at time t−1, t and t+1 and computing the similarity with the time-series pattern of trajectory data stored in the trajectory database.

The overall effects of some of the embodiments mentioned above are further complemented. For example, companies possessing power-generating facilities wish to cut down maintenance costs of the facilities, performing inspection of facilities and replacing components within the guarantee period. This is referred to as a time-based facility maintenance.

However, the recent trend of maintenance is a status-based maintenance in which components are replaced through observation of the status of the facilities. In order to perform status-based maintenance, it is necessary to collect normal and anomaly data of the equipment, and the amount and quality of collected data will determine the quality of status maintenance. However, in many cases, anomaly data is rarely acquired, and it is more difficult to collect anomaly data in larger facilities. Therefore, it is important that outliers are detected from normal data. According to some of the above-described embodiments, the following effects are realized.

The direct effects of the present embodiments are as follows:
(1) Anomaly can be detected from normal data.
(2) Highly accurate anomaly detection is enabled even if collection of data is incomplete.
(3) The influence of anomaly data included in the collected data is accepted.

Further, additional effects of the embodiments are as follows:
(4) Users can easily capture the anomaly phenomenon visually and can comprehend the phenomenon easily.
(5) Designers can capture the anomaly phenomenon visually and can cope with physical phenomenon.
(6) The knowledge of engineers can be utilized.
(7) Physical models can be used in parallel.
(8) Anomaly detection methods having a high calculation load and requiring a long processing time can be applied.

INDUSTRIAL APPLICABILITY

The present invention can be adopted as anomaly detection in plants and other facilities.

REFERENCE SIGNS LIST

11 Multi-dimensional time-series signal acquisition section
12 Characteristic extraction, selection and conversion section
13 Classifier
14 Fusion (global anomaly measure)
15 Learning data database mainly composed of normal cases
24 Characteristic extraction and classification of time-series signal
25 Predictor detection
26 Anomaly diagnosis/prognosis
119 Processor
120 Display unit
121 Database (DB)

The invention claimed is:

1. An anomaly detection method for early detection of an anomaly of a plant or a facility using an anomaly detection system, comprising:
acquiring an observation data from a plurality of multi-dimensional time-series sensors and modeling learning data composed of normal data;
detecting whether anomaly of observation data exists or not based on a similarity between the observation data and the modeled learning data;
evaluating a level of effect of each sensor signal, based on a result of the anomaly detection;
selecting sensor signals using the level of effect;
controlling threshold values of the observation data from the selected sensor signals;
constructing rules of determination conditions, based on the controlled threshold values; and
implementing a countermeasure based on the detected anomaly.

2. The anomaly detection method according to claim 1, further comprising
modeling learning data via a subspace classifier; and
detecting the anomaly based on a distance relationship between the observation data and a subspace.

3. The anomaly detection method according to claim 2, wherein the subspace classifier adopts a projection distance method, a CLAFIC method or a local subspace classifier targeting a vicinity of the observation data.

4. An anomaly detection method for early detection of an anomaly of a plant or a facility using an anomaly detection system, comprising:
acquiring an observation data from a plurality of multi-dimensional time-series sensors and modeling learning data composed of normal data;
detecting whether anomaly of observation data exists or not based on a similarity between the observation data and the modeled learning data; and
accumulating an evaluation result of level of effect of each sensor signal together with anomaly cases, evaluating a level of effect of each sensor signal, based on the accumulated data;
selecting sensor signals using the level of effect;
controlling threshold values of the observation data from the selected sensor signals;
constructing rules of determination conditions, based on the controlled threshold values; and
implementing a countermeasure based on the detected anomaly.

5. The anomaly detection method according to claim 3, wherein a frequency for detecting whether anomaly of observation data exists or not via the similarity between observation data and learning data is performed non-synchronously with collection of data.

6. The anomaly detection method according to claim 3, wherein the determination condition rules obtained with respect to individual sensor signals are either displayed externally or output.

7. The anomaly detection method according to claim 4, further comprising:
performing characteristic conversion of the learning data composed substantially of normal data acquired from the plurality of multi-dimensional time-series sensors and the observation data concurrently and simultaneously.

8. An anomaly detection method for early detection of an anomaly of a plant or a facility, comprising:
acquiring an observation data from a plurality of multi-dimensional time-series sensors and modeling learning data composed of normal data;
detecting whether anomaly of observation data exists or not based on a similarity between the observation data and the modeled learning data;
evaluating a level of effect of each sensor signal, based on a result of the anomaly detection;
selecting sensor signals using the level of effect, thereby creating a relevance network diagram of each sensor signal and modeling the target facility;
controlling threshold values of the observation data from the selected sensor signals;
constructing rules of determination conditions, based on the controlled threshold values; and
implementing a countermeasure based on the detected anomaly.

9. The anomaly detection method according to claim 8, wherein the relevance network diagram of each sensor signal is used for the diagnosis/prognosis of a cause of the anomaly.

10. An anomaly detection method for early detection of an anomaly of a plant or a facility, comprising:
acquiring an observation data from a plurality of multi-dimensional time-series sensors and modeling learning data composed of normal data;
detecting whether anomaly of observation data exists or not based on a similarity between the observation data and the modeled learning data;
using data stored in a database storing data including anomaly cases, level of effect of each sensor signal, past selection results for anomaly diagnosis/prognosis;
evaluating a level of effect of each sensor signal, based on a result of the anomaly detection;
selecting sensor signals using the level of effect;
controlling threshold values of the observation data from the selected sensor signals;
constructing rules of determination conditions, based on the controlled threshold values; and
implementing a countermeasure based on the detected anomaly.

11. An anomaly detection and diagnosis/prognosis method for early detection and diagnosis/prognosis of an anomaly of a plant or a facility, comprising:
acquiring an observation data from a plurality of multi-dimensional time-series sensors and modeling learning data composed of normal data;
detecting whether anomaly of observation data exists or not based on a similarity between the observation data and the modeled learning data;
providing a list of possible countermeasures when a phenomenon related to a new anomaly occurs using data stored in a database storing data including anomaly cases, level of effect of each sensor signal, past selection results, based on a connectivity among elements representing phenomenon, areas and measures of a plurality of cases;
evaluating a level of effect of each sensor signal, based on a result of the anomaly detection;
selecting sensor signals using the level of effect;
controlling threshold values of the observation data from the selected sensor signals;
constructing rules of determination conditions, based on the controlled threshold values; and
implementing a countermeasure based on the detected anomaly.

12. An anomaly detection system for early detection of an anomaly of a plant or a facility, comprising:
a processor that acquires an observation data from a plurality of multi-dimensional time-series sensors, wherein the processor models learning data composed of normal data, and the processor detects whether anomaly of observation data exists or not based on a similarity between the observation data and the modeled learning data, wherein
the processor, evaluates a level of effect of each sensor signal, constructing determination condition rules, and a displaying section for displaying sensor signals corresponding to the anomaly,
the processor evaluates a level of effect of each sensor signal based on a result of the anomaly detection, selects sensor signals using the level of effect, controls threshold values of the observation data from the selected sensor signals, and constructs rules of determination conditions based on the controlled threshold values, and
a countermeasure is implemented based on the detected anomaly.

13. An anomaly detection system for early detection of an anomaly of a plant or a facility, comprising:
a processor that acquires an observation data from a plurality of multi-dimensional time-series sensors, wherein the processor also models learning data composed of normal data, and the processor detects whether anomaly of observation data exists or not based on a similarity between the observation data and the modeled learning data;
a data storage section for storing a result of evaluation of level of effect of each sensor signal and anomaly cases, wherein
the processor constructs determination condition rules, and selecting and displaying sensor signals corresponding to the anomaly,
the processor evaluates a level of effect of each sensor signal based on accumulated data, selects sensor signals using the level of effect, controls threshold values of the observation data from the selected sensor signals, and constructs rules of determination conditions based on the controlled threshold values, and
a countermeasure is implemented based on the detected anomaly.

14. The anomaly detection system according to claim 13, wherein a frequency for detecting whether anomaly of observation data exists or not based on the similarity between the observation data and the learning data is performed non-synchronously with collection of data.

15. The anomaly detection system according to claim 13, wherein the determination condition rules obtained with respect to individual sensor signals are either displayed externally or output.

16. The anomaly detection system according to claim 12, wherein:
the processor models learning data via a subspace classifier, and the processor detects an anomaly based on a distance relationship between the observation data and subspace, wherein
the system models learning data via a subspace classifier, and detects anomaly based on a distance relationship between the observation data and subspace.

17. The anomaly detection system according to claim 16, wherein the subspace classifier adopts a projection distance method, a CLAFIC method or a local subspace classifier targeting a vicinity of the observation data.

18. An anomaly detection system for early detection of an anomaly of a plant or a facility, comprising:
a processor that acquires an observation data from a plurality of multi-dimensional time-series sensors, wherein the processor models learning data composed of normal data, and the processor detects whether anomaly of observation data exists or not based on a similarity between the observation data and the modeled learning data, and the processor also evaluates a level of effect of each sensor signal, wherein
the processor creates a relevance network diagram of each sensor signal,
the processor evaluates a level of effect of each sensor signal based on a result of the anomaly detection, selects sensor signals using the level of effect, controls threshold values of the observation data from the selected sensor signals, and constructs rules of determination conditions based on the controlled threshold values, and
a countermeasure is implemented based on the detected anomaly.

19. The anomaly detection system according to claim 18, wherein a relevance network diagram of each sensor signal is used for the diagnosis/prognosis of a cause of the anomaly.

20. An anomaly detection system for early detection of an anomaly of a plant or a facility, comprising:
a processor that acquires an observation data from a plurality of multi-dimensional time-series sensors, wherein the processor models learning data composed of normal data, and the processor detects whether anomaly of observation data exists or not based on a similarity between the observation data and the modeled learning data, and the processor also evaluates the level of effect of each sensor signal, wherein the processor creates a relevance network diagram of each sensor signal; and
a database for accumulating data composed of anomaly cases, level of effect of each sensor signal, and past selection results, wherein
the processor evaluates a level of effect of each sensor signal based on a result of the anomaly detection, selects sensor signals using the level of effect, controls threshold values of the observation data from the selected sensor signals, and constructs rules of determination conditions based on the controlled threshold values, and
a countermeasure is implemented based on the detected anomaly.

21. An anomaly detection and diagnosis/prognosis system for early detection and diagnosis/prognosis of an anomaly of a plant or a facility, comprising:
a processor that acquires an observation data from a plurality of multi-dimensional time-series sensors, wherein the processor models learning data composed of normal data, and the processor detects whether anomaly of observation data exists or not based on a similarity between the observation data and the modeled learning data, and the processor also evaluates the level of effect of each sensor signal, wherein the processor creates a relevance network diagram of each sensor signal;
a database for storing data including anomaly cases, level of effect of each sensor signal, and past selection results; wherein
the processor evaluates the connectivity among elements representing phenomenon, areas and measures of a plurality of cases,
the processor evaluates a level of effect of each sensor signal based on a result of the anomaly detection, selects sensor signals using the level of effect, controls threshold values of the observation data from the selected sensor signals, and constructs rules of determination conditions based on the controlled threshold values, and
a countermeasure is implemented based on the detected anomaly.

22. A non-transitory computer readable medium storing an anomaly detection program for early detection of an anomaly of a plant or a facility, wherein when executed the anomaly detection program causes a computer to perform the following steps:
acquiring an observation data from a plurality of multi-dimensional time-series sensors and modeling learning data composed of normal data;
detecting whether anomaly of observation data exists or not based on a similarity between the observation data and the modeled learning data;
evaluating a level of effect of each sensor signal, based on a result of the anomaly detection;
selecting sensor signals using the level of effect;
controlling threshold values of the observation data from the selected sensor signals;
constructing rules of determination conditions, based on the controlled threshold values, and
implementing a countermeasure based on the detected anomaly.

23. A non-transitory computer readable medium storing an anomaly detection program for early detection of an anomaly of a plant or a facility, wherein when executed the anomaly detection program causes a computer to perform the following steps via a medium or an online service:
acquiring an observation data from a plurality of multi-dimensional time-series sensors and modeling learning data composed of normal data;
detecting whether anomaly of observation data exists or not based on a similarity between the observation data and the modeled learning data;
evaluating a level of effect of each sensor signal, based on a result of the anomaly detection;
selecting sensor signals using the level of effect;
controlling threshold values of the observation data from the selected sensor signals;
constructing rules of determination conditions, based on the controlled threshold values; and
implementing a countermeasure based on the detected anomaly.

* * * * *